United States Patent [19]

Romine

[11] Patent Number: 5,491,555
[45] Date of Patent: Feb. 13, 1996

[54] MEASUREMENT REFERENCING AND TRANSFERRING INSTRUMENT

[76] Inventor: Michael L. Romine, 314 Karen Ave., Romeoville, Ill. 60441

[21] Appl. No.: 357,870

[22] Filed: Dec. 16, 1994

Related U.S. Application Data

[63] Continuation-in-part of Ser. No. 170,713, Dec. 21, 1993, abandoned.

[51] Int. Cl.⁶ .................................................. G01B 11/00
[52] U.S. Cl. ...................... 356/399; 33/286; 33/DIG. 21; 356/153; 356/254
[58] Field of Search ...................................... 356/138, 153, 356/399, 247–249, 253–255; 33/227, 286, 290–292, DIG. 21

[56] References Cited

U.S. PATENT DOCUMENTS

| | | |
|---|---|---|
| 3,355,979 | 12/1967 | Wirtanen ................................. 356/399 |
| 3,894,805 | 7/1975 | Middleton . |
| 3,918,813 | 11/1975 | Rossiter . |
| 4,112,584 | 9/1978 | Kooi et al. . |
| 4,274,203 | 6/1981 | Vasile . |
| 4,281,463 | 8/1981 | Kobayashi et al. . |
| 4,291,982 | 9/1981 | Chin . |
| 4,333,242 | 6/1982 | Genho, Sr. . |
| 4,674,188 | 6/1987 | Fisher . |
| 4,837,717 | 6/1989 | Wiklund et al. . |
| 4,852,265 | 8/1989 | Rando et al. ............................. 33/227 |
| 4,907,882 | 3/1990 | Waibel et al. . |
| 4,973,158 | 11/1990 | Marsh . |
| 4,988,192 | 1/1991 | Knittel . |
| 4,993,161 | 2/1991 | Borkovitz . |
| 5,075,977 | 12/1991 | Rando ..................................... 356/138 |
| 5,108,177 | 4/1992 | Middleton . |
| 5,159,760 | 11/1992 | Spiegel et al. . |

OTHER PUBLICATIONS

Edmund Scientific Catalog # 14N7, p. 9 (1994).

Primary Examiner—F. L. Evans
Attorney, Agent, or Firm—Leo Zucker

[57] ABSTRACT

A measurement referencing and transferring technique includes locating a platform base at a working location, mounting a sighting mechanism having a sighting axis on the platform base, and sighting a selected point on a first object in a given direction from the platform base by adjusting the position of the platform base relative to the working location thereby directing the sighting axis of the sighting mechanism toward the first object, and aligning the axis incident with the selected point on the first object. A reference point is then marked on a second object in a direction opposite the given direction from the platform base, by observing along the aligned sighting axis in the direction away from the first object, and defining the reference point as that point on the second object with which the sighting axis is incident. A measurement associated with the selected point on the first object is determined by referring to the reference point marked on the second object.

44 Claims, 20 Drawing Sheets

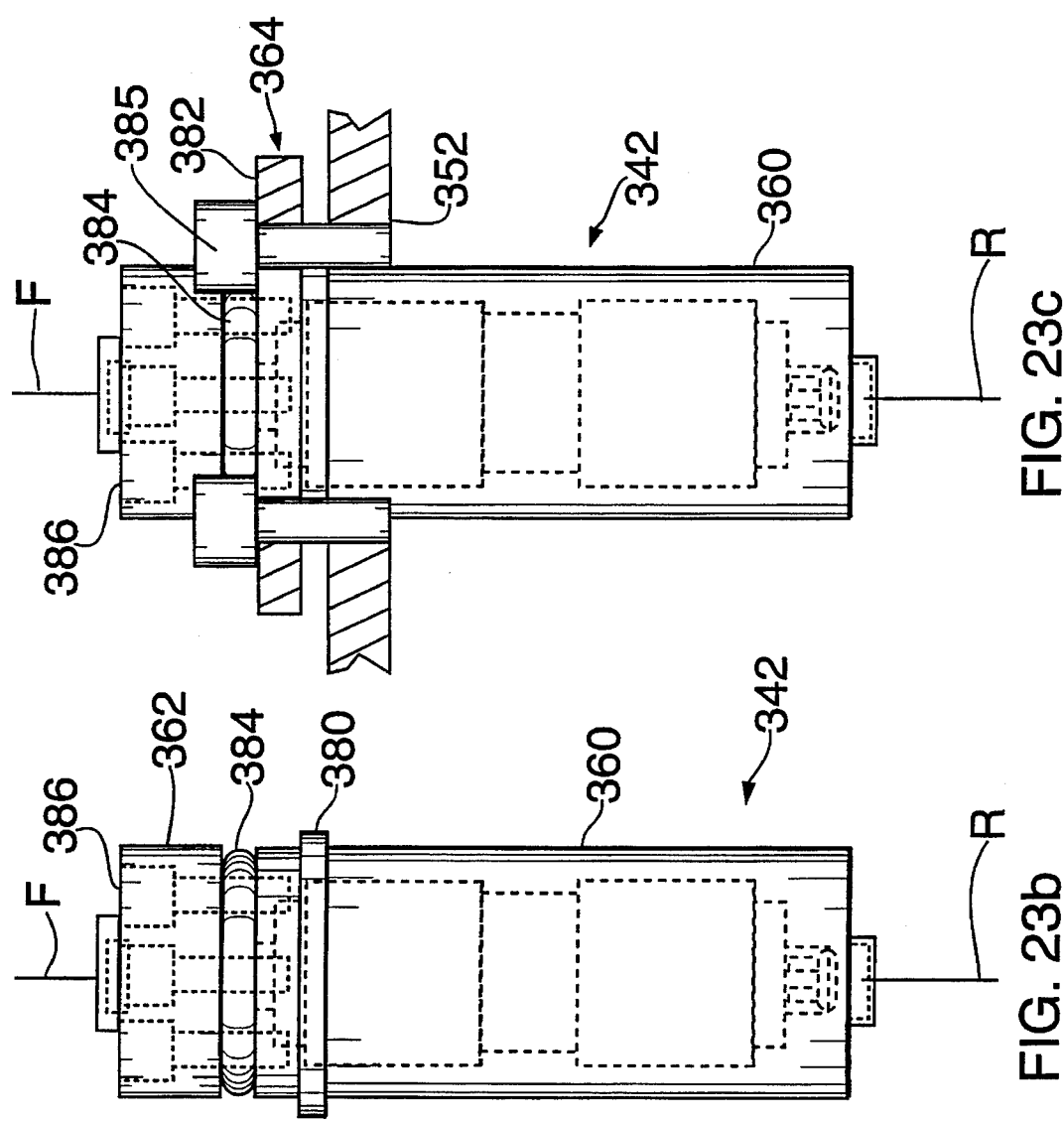
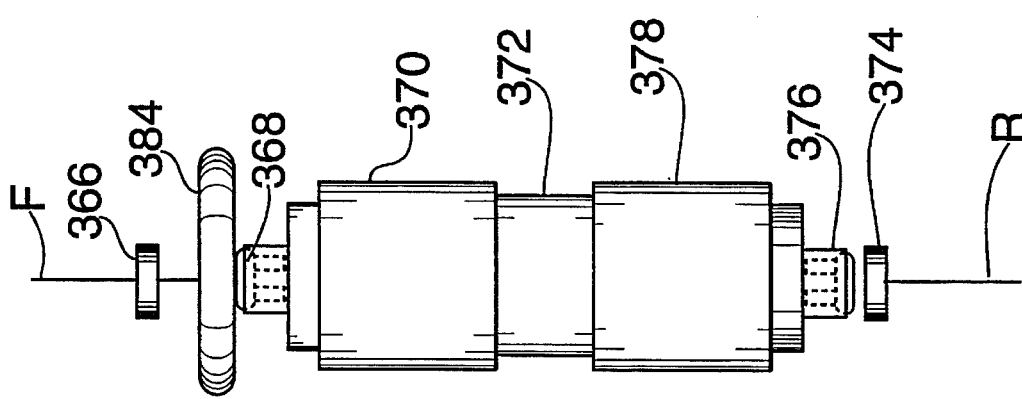
FIG. 23c
FIG. 23b
FIG. 23a

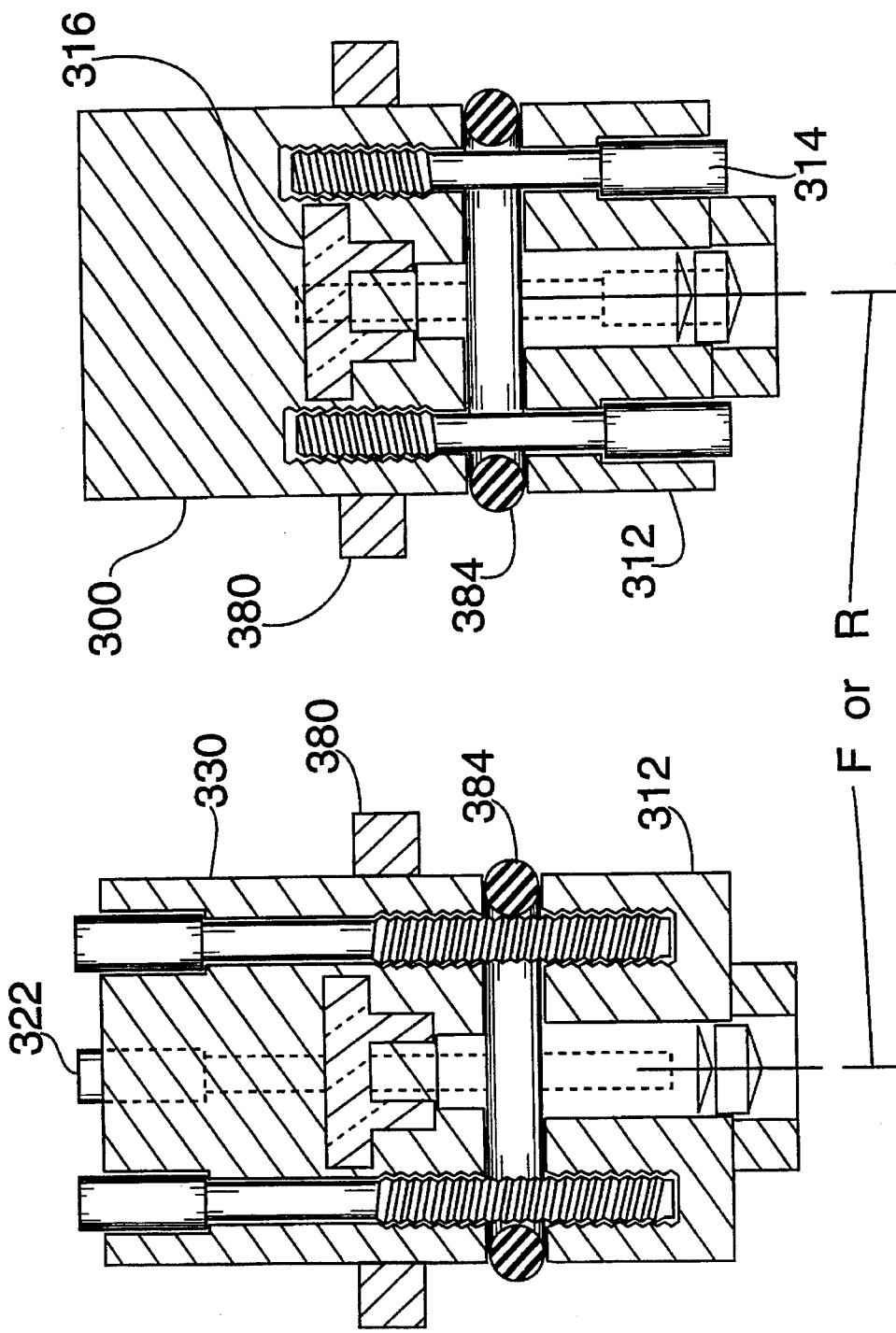

MEASUREMENT REFERENCING AND TRANSFERRING INSTRUMENT

This application is a continuation in part of my application Ser. No. 08/170,713 filed Dec. 21, 1993, now abandoned.

BACKGROUND OF THE INVENTION

1. Field of the Invention

The present invention relates to surveying instruments, and more particularly to a measurement referencing and transferring instrument that enables a user at a working location to sight a selected point on a remote object, and to transfer the selected point along a sighting axis in the opposite direction onto another object, to facilitate measurements associated with the remote object.

2. Description of the Known Art

Surveying instruments having either an optical viewing system or a laser device for emitting a collimated light beam, are generally known. Such instruments tend to be expensive and, in most cases, meet only one particular application. The known transits, levels and laser instruments can perform their intended tasks quite well; however, their individual design configurations tend to limit each instrument to its own special use.

U.S. Pat. No. 4,291,982 issued Sep. 29, 1981, discloses a multi-purpose surveying instrument for use as a theolodite to survey inclinations, a horizontal plane or angles, and to survey perpendicularity or vertical angles. The instrument has a single sighting telescope that rests on an instrument base with leveling tubes. The instrument base is fastened atop an adjusting base having a set of leveling screws, and the adjusting base in turn is mounted on a tripod in a conventional manner.

U.S. Pat. No. 3,918,813 issued Nov. 11, 1975, describes an optical viewing alignment unit for use in a telescope gun sight, wherein the gun sight is aligned by auto-collimation. The collimator includes a light source, lens, and a graticule with the axis of the collimator perpendicular to a non-reflecting side of a beam splitting cube. Light from the collimator including a datum line image enters the cube and is split vertically to appear in the telescope eyepiece, and to exit through a window of the gun mount to a target.

A construction laser for providing a number of detectable reference lines, is described in U.S. Pat. No. 4,333,242 (Jun. 8, 1982). A housing of the laser is supported on feet that are attached to the housing through a motor driven alignment and leveling device. Further, U.S. Pat. No. 4,973,158 (Nov. 27, 1990) discloses a rotating laser beam plane instrument for use in the surveying and construction industries. The instrument provides a plane of laser light which acts as a position reference when detected by portable electronic detectors. Another instrument for providing a rotating laser beam in a horizontal plane, is shown in U.S. Pat. No. 4,993,161 issued Feb. 19, 1991.

It is also known to project a laser beam from the base of a geodetic instrument toward a defined ground mark, for purposes of plummeting. U.S. Pat. No. 5,159,760 issued Nov. 3, 1992, shows a laser collimator built in an upper plate of a tribrach which supports a theodolite on a tripod. A light beam from the collimator passes through an opening in a lower base plate of the tribrach, to align the instrument over a ground mark such as a boundary stone, according to the patent.

U.S. Pat. No. 3,355,979 (Dec. 5, 1967) discloses an optical device that enables one to determine the line of sight between two fixed points. U.S. Pat. Nos. 4,852,265 (Aug. 1, 1989) and 5,075,977 (Dec. 31, 1991) show devices capable of emitting laser light beams in vertical directions for plummeting.

Leveling lasers comprising a laser diode built into a precision construction level are known, wherein the diode projects a beam of light from one end of the level to provide a visible laser dot on a surface up to 100 feet away. Such leveling lasers are available, e.g., from Edmund Scientific Company, Barrington, N.J.—Stock Nos. J52,201-3.

A need has arisen on the part of home owners, building contractors and other trade persons involved in the building repair and construction fields, for a relatively inexpensive but nonetheless accurate sighting and surveying instrument capable of performing a number of measurement and referencing tasks, and which can be readily set up for use in the field.

SUMMARY OF THE INVENTION

The present invention meets the need for a single instrument capable of performing various tasks that until now required dedicated laser sources, optical viewing systems, and levels. Thus, the invention will be of value to the civil engineer, construction superintendent and trade craftsperson, as well as to the capable homeowner. Referred to hereafter as a measurement referencing and transferring instrument (MRTI), the present invention provides within one instrument body a tool capable of performing accurate measurement referencing and transferring; laser and/or optical alignment, leveling or plummeting; and accurate angle finding measurements. With applications that span many of the contracting and construction fields, the MRTI is a compact instrument that offers versatility, viability and affordability to persons in the trade. As the following disclosure makes clear, the MRTI is more a tool than an instrument—a tool suitable for use by persons in the building trades as well as by inspectors and engineers. The MRTI has few moving parts, is rugged, reliable, easy to operate, and has capabilities aimed to support many trade applications. The MRTI meets the needs of various persons requiring precise measurement calculations.

According to the invention, a measurement referencing and transferring method comprises the steps of locating a platform base at a working location, and mounting sighting means having a sighting axis on the platform base. A selected point on a first object is sighted in a given direction from the platform base by adjusting the position of the platform base relative to the working location thereby directing the sighting axis of the sighting means toward the first object, and aligning the axis to be incident with the selected point on the first object. The method also includes marking a reference point on a second object in a direction opposite the given direction from the platform base by observing along the aligned sighting axis in the direction away from the first object, and defining the reference point as that point on the second object with which the sighting axis is incident. A measurement associated with the selected point on the first object is determined by referring to the reference point marked on the second object.

According to a further aspect of the invention, a measurement referencing and transferring instrument includes a platform base, and sighting means mounted on the platform base and having a sighting axis. Means associated with the base is operative to adjust the position of the base relative to a working location at which the base is located, including means for directing the sighting axis in a given direction from the base toward a first object and for aligning the axis to be incident on a selected point on the first object. The sighting means has means for marking a reference point on a second object in a direction opposite said given direction from the base, and for observing along the aligned sighting axis in the direction away from the first object. A reference point corresponding to the selected point on the first object is defined as that point on the second object with which the sighting axis is incident.

According to another aspect of the invention, a measurement referencing and transferring instrument includes a platform base and optical viewing means fixed on the platform base for enabling a user to sight a reference point along a view axis. Light source means is fixed on the base and emits a light beam along a beam axis in a direction away from the reference point. The optical viewing means and the light source means are arranged so that the beam axis of the light source means can be aligned parallel to the view axis of the optical viewing means.

According to a further aspect of the invention, a measurement referencing and transferring instrument includes a platform base having a viewing opening, and frame means on a top surface of the platform base for supporting instrument components including parts of optical viewing means and parts of light source means. The optical viewing means has a view axis for enabling a user to sight a reference point along the view axis, wherein the view axis passes through the viewing opening in the platform base. The light source means has a beam axis, and emits a light beam along the beam axis in a direction away from the reference point. Adjusting means is provided for adjusting at least one of the optical viewing means and the light source means, so that the beam axis of the light source means can be aligned parallel to the view axis of the optical viewing means.

For a better understanding of the present invention, together with other and further objects, reference is made to the following description taken in conjunction with the accompanying drawing, and the scope of the invention will be pointed out in the appended claims.

BRIEF DESCRIPTION OF THE DRAWING

In the drawing:

FIGS. 20 to 23 show another embodiment of the MRTI having a dual laser diode sighting module assembly, wherein FIG. 20 is a perspective view of the MRTI showing assembled components beneath the instrument cover;

FIG. 21 is a plan view of the MRTI as seen from the top in FIG. 20, with the cover broken-away;

FIG. 22 is an end view of the MRTI as seen from the back in FIG. 20;

FIG. 23(a) is a partial assembly view of a dual laser diode sighting module that is mounted in the MRTI of FIG. 20;

FIG. 23(b) is a view of the assembled dual laser diode sighting module; and

FIG. 23(c) is a view of the sighting module of FIG. 23(b) as mounted in the MRTI of FIG. 20; and FIGS. 24(a) & 24(b) are detail views of separate laser diode modules used in the embodiments of FIGS. 16 to 19.

DETAILED DESCRIPTION OF THE INVENTION

Figure 1:
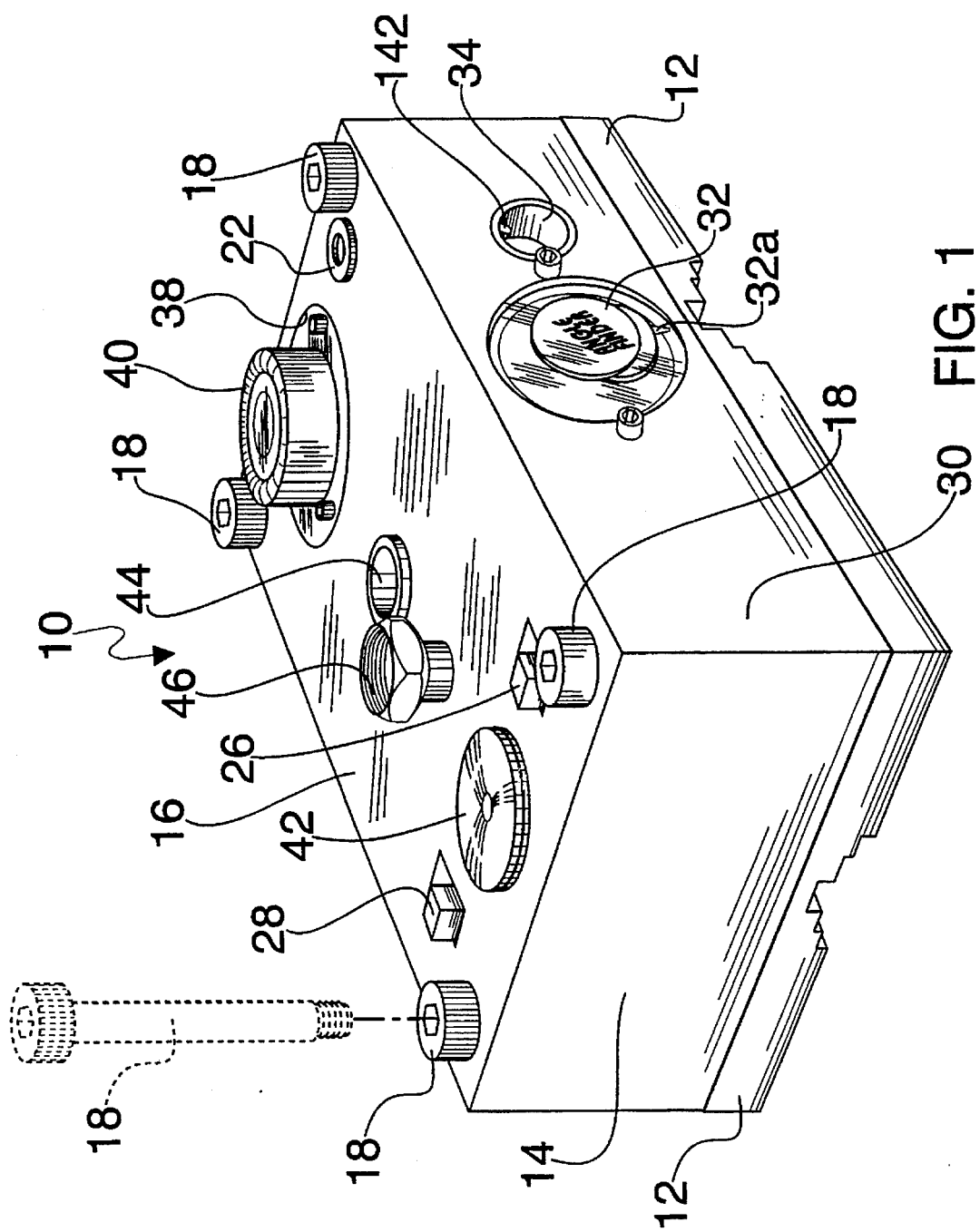
FIG. 1 is a perspective view of the present measurement referencing and transferring instrument (MRTI)

FIG. 1 is a perspective view of the present measurement referencing and transferring instrument 10, also referred to as a "MRTI".

The MRTI 10 comprises a platform or base 12 and a protective cover 14. The top of the cover 14 forms an operating panel 16 for the instrument. The cover 14 is fastened in place on the platform base 12 by a set of four removable fastening screws 18. The screws 18 pass through openings at each corner of the cover 14, to engage threaded openings 20 at the four corners of the platform base 12 (See FIG. 2).

The operating panel 16 has a pair of electrical jack connectors 22, 24 at the far, right side of the panel 16 as viewed in FIG. 1, and a pair electrical slide switches 26, 28 at the near, left side of the panel. The jack connectors 22, 24 are provided for enabling the MRTI 10 to be powered by an external battery source, and to allow a battery charger pack (not shown) to connect with the instrument 10 for purposes of recharging an internal instrument battery. The slide switches 26, 28 enable a user to select either internal or external battery power, and to energize a set of indicator lamps provided on the instrument 10.

The protective cover 14 also has a long side panel 30 that extends perpendicular to the instrument base 12 when the cover 14 is fastened over the base. A conventional "Angle Finder" 32 is fastened on the side panel 30 so as to present a calibrated 360 degree dial face to the user. A weighted, free swiveling dial pointer 32a constantly points downwardly and the dial face of the angle finder 32 is set so as to obtain a "0" reading when the base 12 is aligned in a horizontal plane. Adjacent the angle finder 32 is an opening 34 in the side panel 30, for viewing a first bull's eye level 36 (FIG. 2) mounted on a vertical wall inside the instrument 10. Another opening 38 is provided through the operating panel 16 to allow for passage of a second bull's eye level 40 which is mounted on a horizontal wall in the instrument 10.

An eyepiece 42 is mounted at the near, left side of the panel 16 as viewed in FIG. 1, and enables the user to establish a reference mark along an optical view axis of the instrument 10 as described in detail below. The eyepiece 42 may include a flat glass plate, or contain lens elements for providing some degree of magnification up to, for example, 2 times. Another opening 44 is formed centrally in the panel 16 to allow passage of a light or laser beam from a source inside the instrument 10, the beam being directed upwardly relative to instrument base 12. A knob 46 extends from the panel 16 between the eyepiece 42 and the opening 44, for enabling the user to energize a laser beam source which is fixed to the platform base 12.

The protective cover 14 and the platform or base 12, may be fabricated from, for example, type 6061-T6 aluminum. It is preferred that metal base and cover parts of the MRTI 10 be anodized to resist corrosion when the instrument is used in the field.

Figure 2:
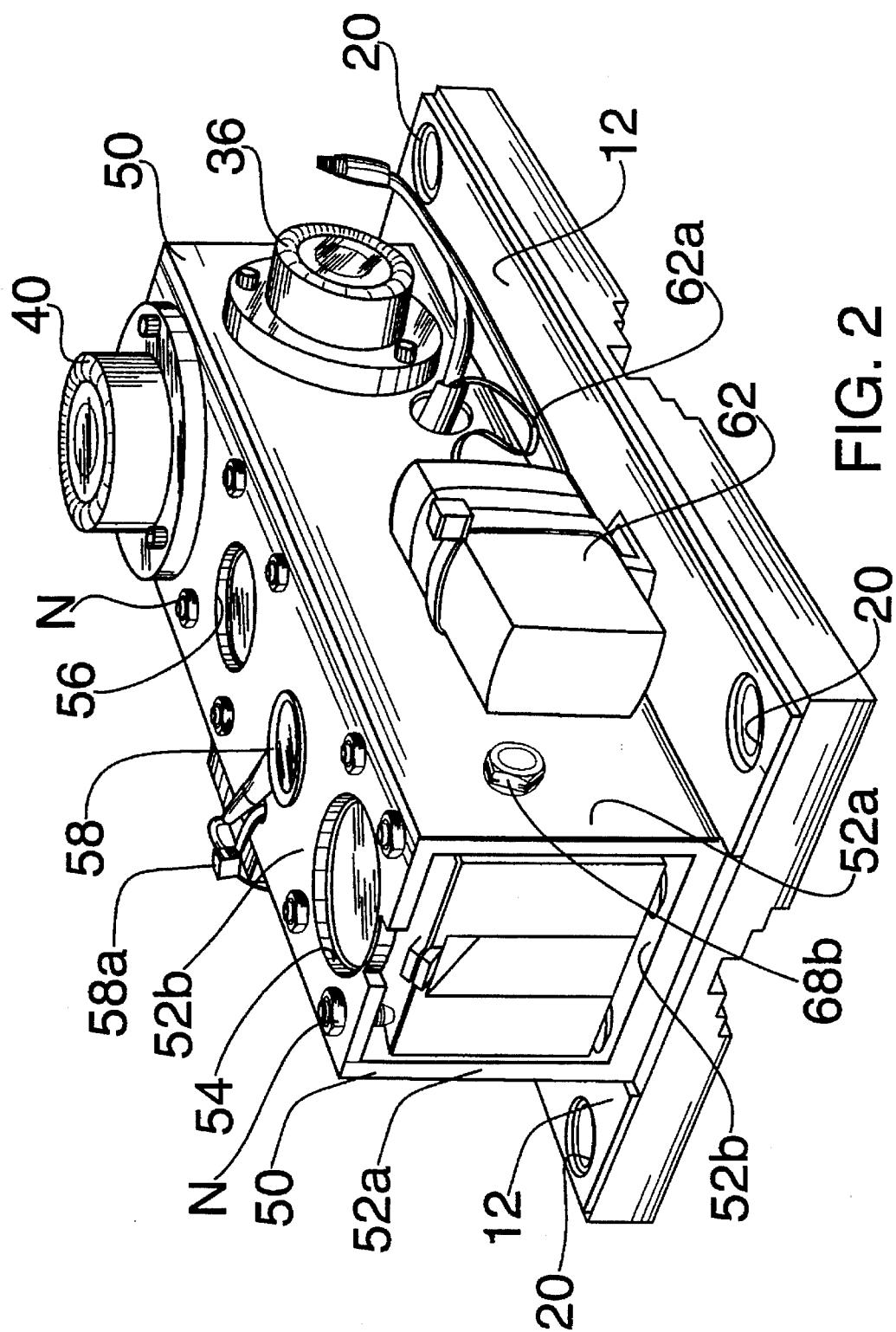
FIG. 2 is a perspective view similar to FIG. 1, with a protective instrument cover removed.

FIG. 2 is a perspective view similar to FIG. 1, with the protective cover 14 removed.

An elongate box or frame member 50 is fixed to the instrument base 12 symmetric with the long center line of the base 12. Side, top and bottom walls 52a, 52b of the frame member 50 define vertical and horizontal surfaces with respect to the base 12 to which the member 50 is fixed. The first bull's eye level 36 is fixed at an end of the right vertical wall 52a as viewed in FIG. 2, and the second bull's eye level 40 is fixed at an end of horizontal top wall 52b.

An eyepiece opening 54 is formed in the top wall 52b coaxial with the axis of the eyepiece 42 (FIG. 1) when the instrument cover 14 is fastened on the base 12. A light beam opening 56 is formed centrally in the top wall 52b and concentric with the axis of light beam opening 44 (FIG. 1) in the panel 16 of the instrument cover 14. The bull's eye levels 36, 40 are positioned on the frame walls 52a, 52b so as to align with the openings 34 and 38 in the instrument cover 14.

A touch-sensitive switch 58 is mounted on the top wall 52b to align with a confronting part of the knob 46 on the cover panel 16. That is, a stem of the knob 46 extends below the panel 16 and closes the switch 58 when the knob 46 is rotated, e.g., clockwise from an "OFF" position by the user. Switch 58 has an associated pair of leads 58a that are connected to a laser drive unit 60 at the rear side of the platform 12 (See FIG. 3).

An internal power source 62 is mounted adjacent the frame member 50. Power source 62 may be, e.g., a conventional 9-volt alkaline battery or a rechargeable battery. A set of leads 62a connect the battery 62 to laser drive unit 60, and to an electrical terminal block 64 shown in FIG. 3.

Figure 3:
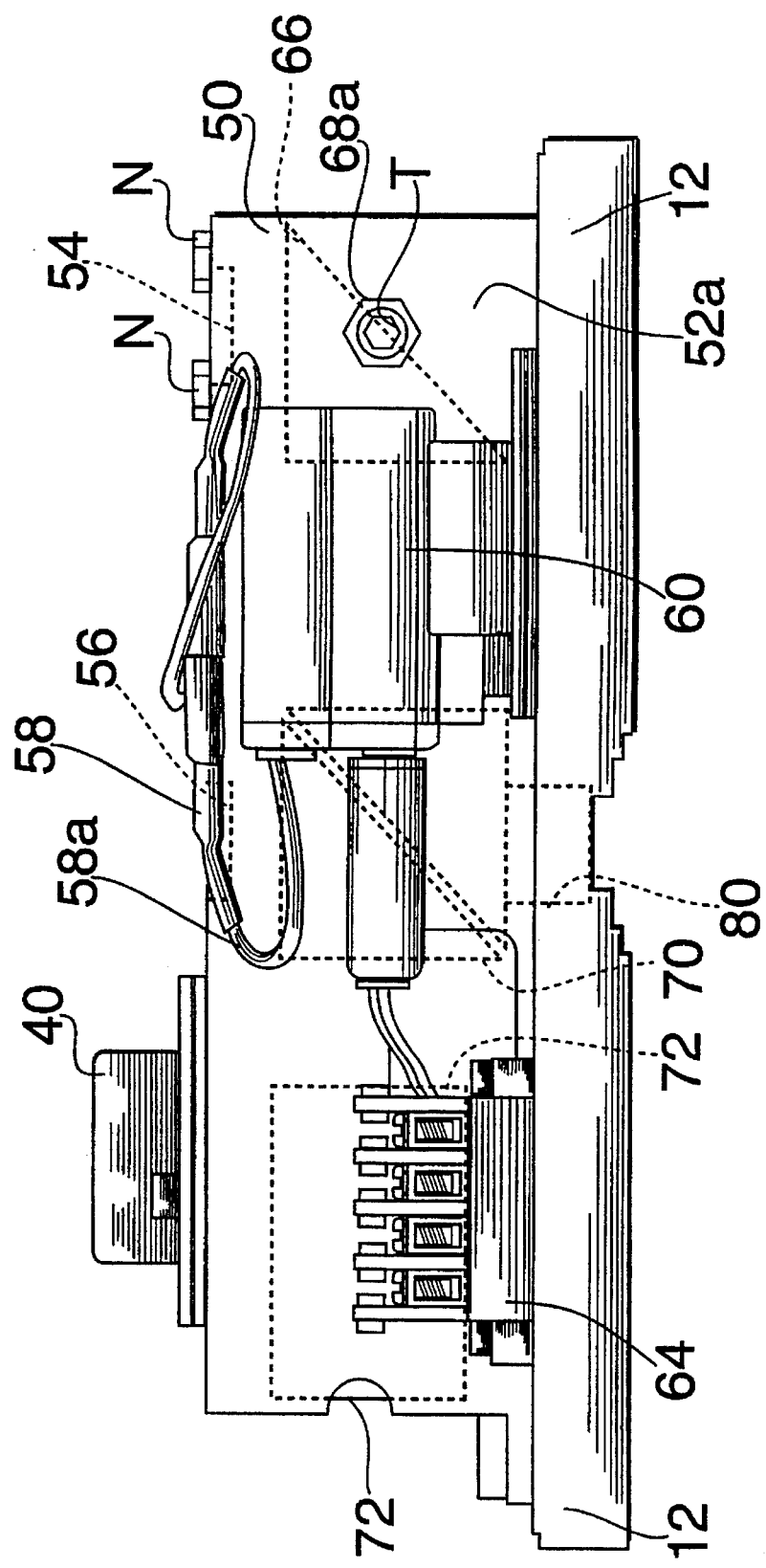
FIG. 3 is a rear view of the instrument in FIG. 2.
Figure 13:
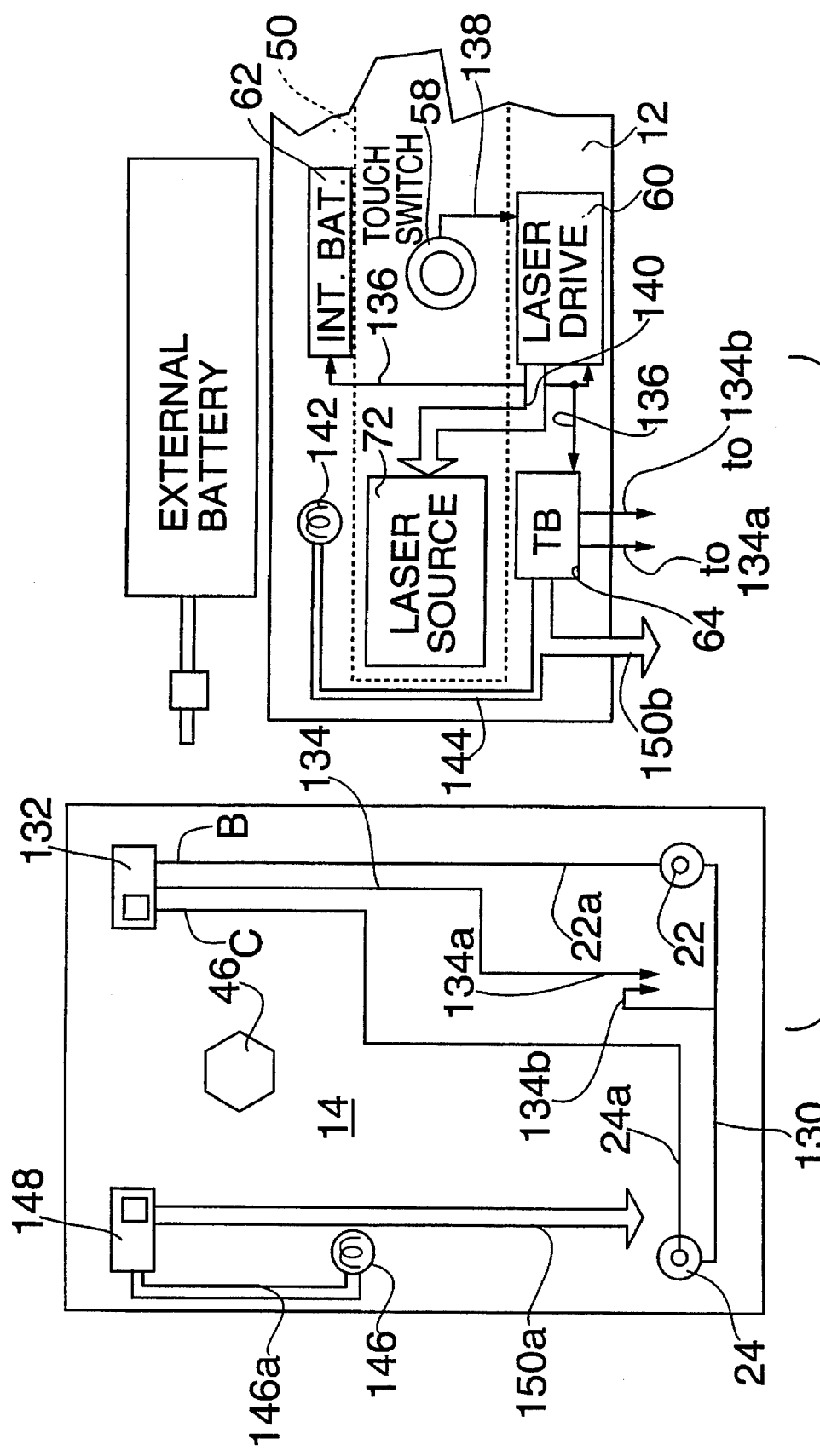
FIG. 13 is a schematic diagram showing wire cable connections between electrical components of the MRTI.

FIG. 3 is a rear view of the instrument base 12, frame member 50 and associated components. The laser drive unit 60, shown toward the right in FIG. 3, may be a conventional unit such as model LA-1, available from Emerging Technologies, Little Rock, Ark. Terminal block 64, at the left, enables various leads and wire cables associated with electrical components mounted on the base 12 and the removable cover 14, to be inter-connected with one another. Further details of electrical connections between the drive unit 60, power source 62 and other components of the instrument 10 are shown in FIG. 13.

Figure 7:
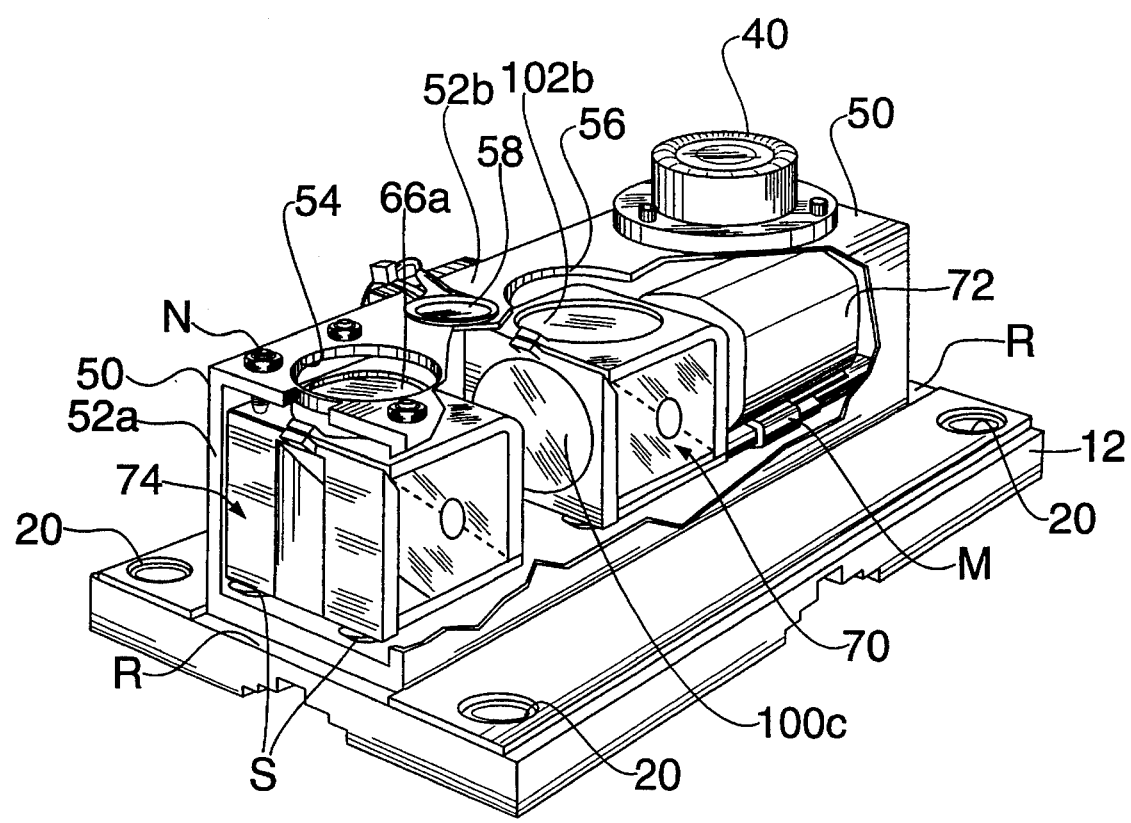
FIG. 7 is a perspective view of the MRTI interior as in FIG. 2, showing components housed inside a protective frame member with parts of the frame member broken away.
Figure 8:
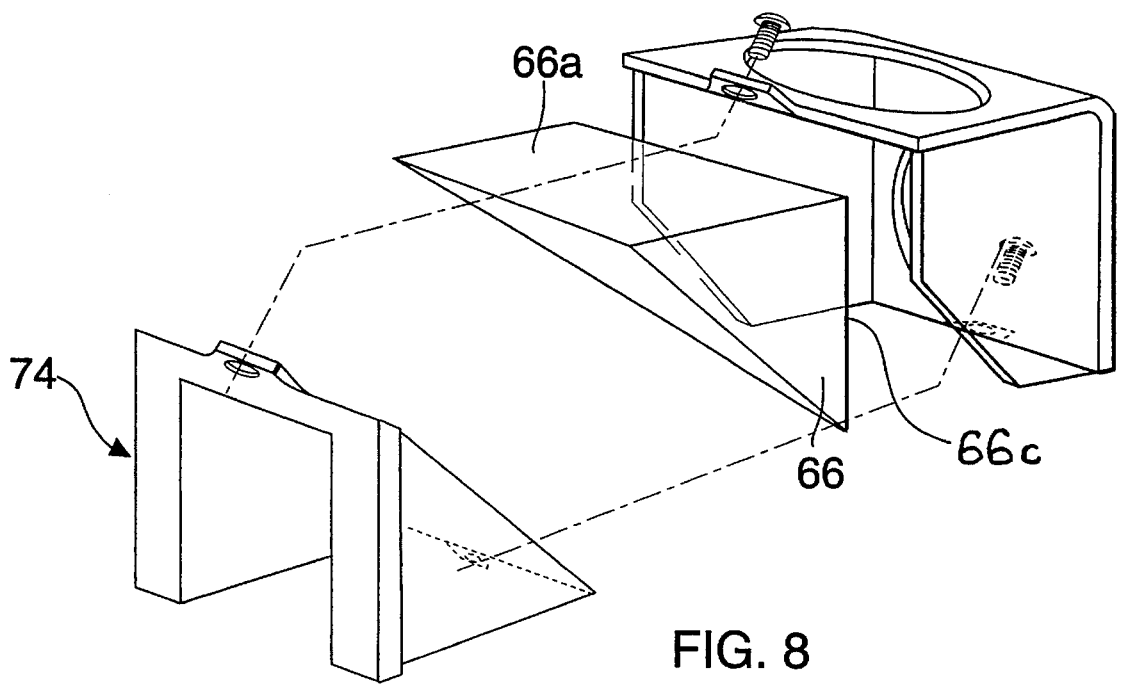
FIG. 8 is an enlarged, exploded view of a single prism and holder assembly housed at the left end of the frame member in FIG. 7.

Two prism assemblies are housed inside the frame member 50 and form part of the optical viewing system of the instrument 10. See FIGS. 7 to 9. A single eyepiece prism 66 is mounted in a holder and aligned within the member 50 via a pair of conical tipped screws T which are supported by the side walls of the member 50. The screws are locked in place with lock nuts 68a, 68b. The prism 66 is further set in position via a set of four retaining screws with associated lock nuts N, arranged about the eyepiece opening 54. Details of the prism 66 and its holder are shown in FIG. 8.

Figure 5:
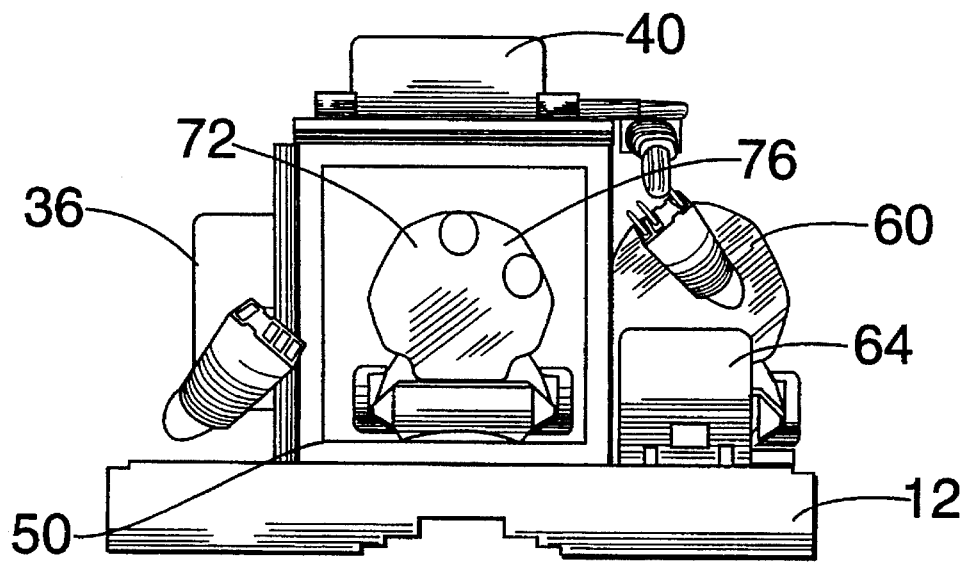
FIG. 5 is a right-end view of the instrument in FIG. 2.
Figure 6:
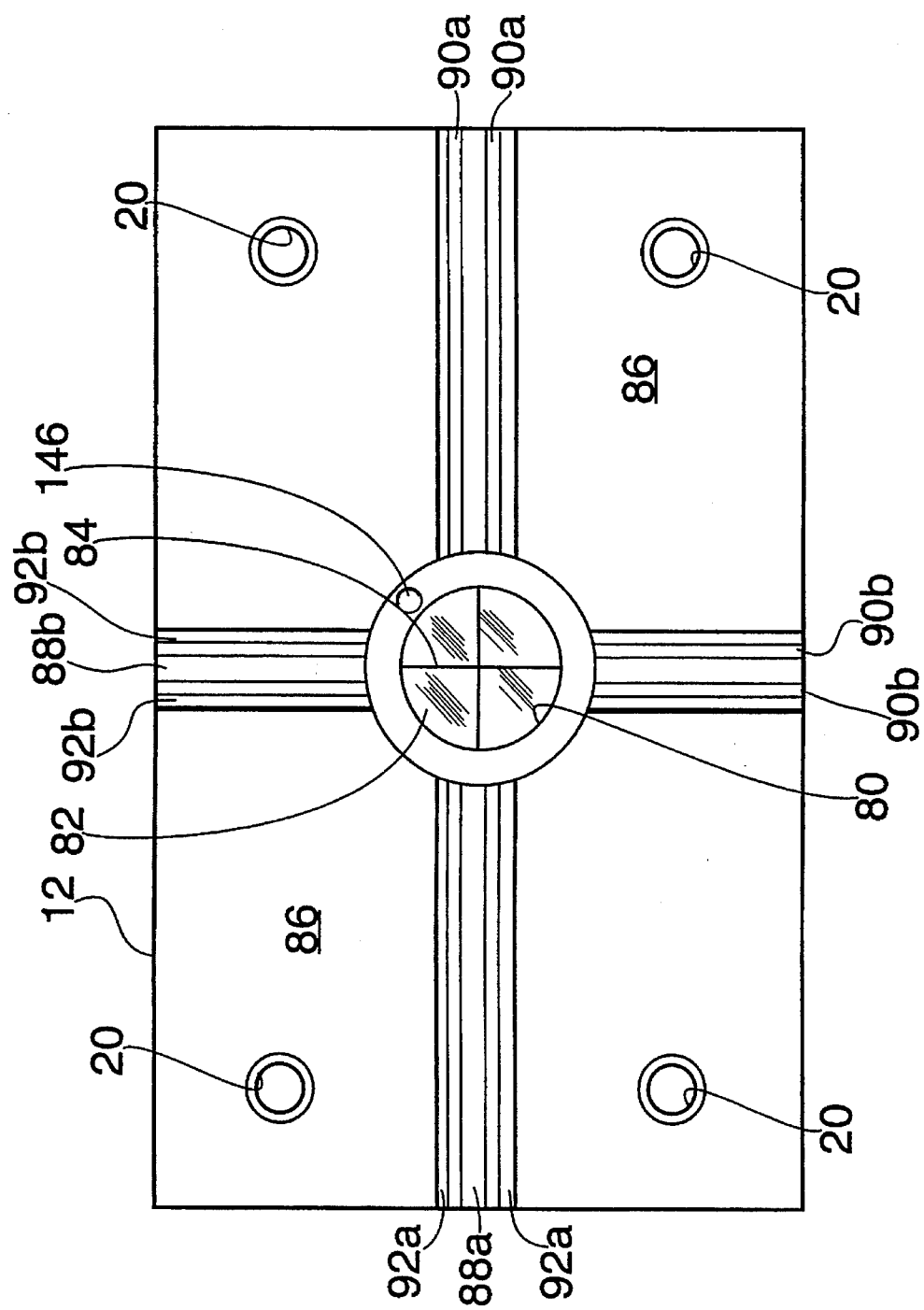
FIG. 6 is a bottom plan view of the instrument base, showing stepped tape measure guide grooves and a central viewing opening and reticle.
Figure 9:
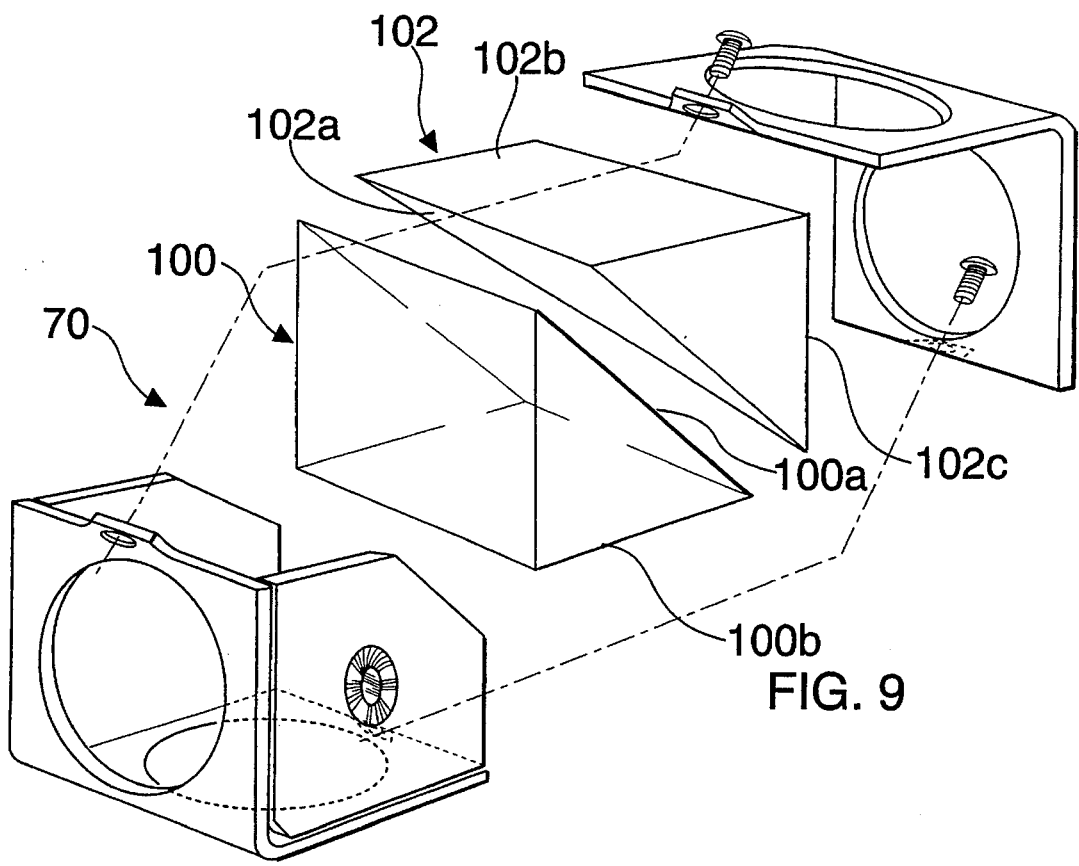
FIG. 9 is an enlarged, exploded view of a dual prism and holder assembly housed at the center portion of the frame member in FIG. 7.
Figure 12:
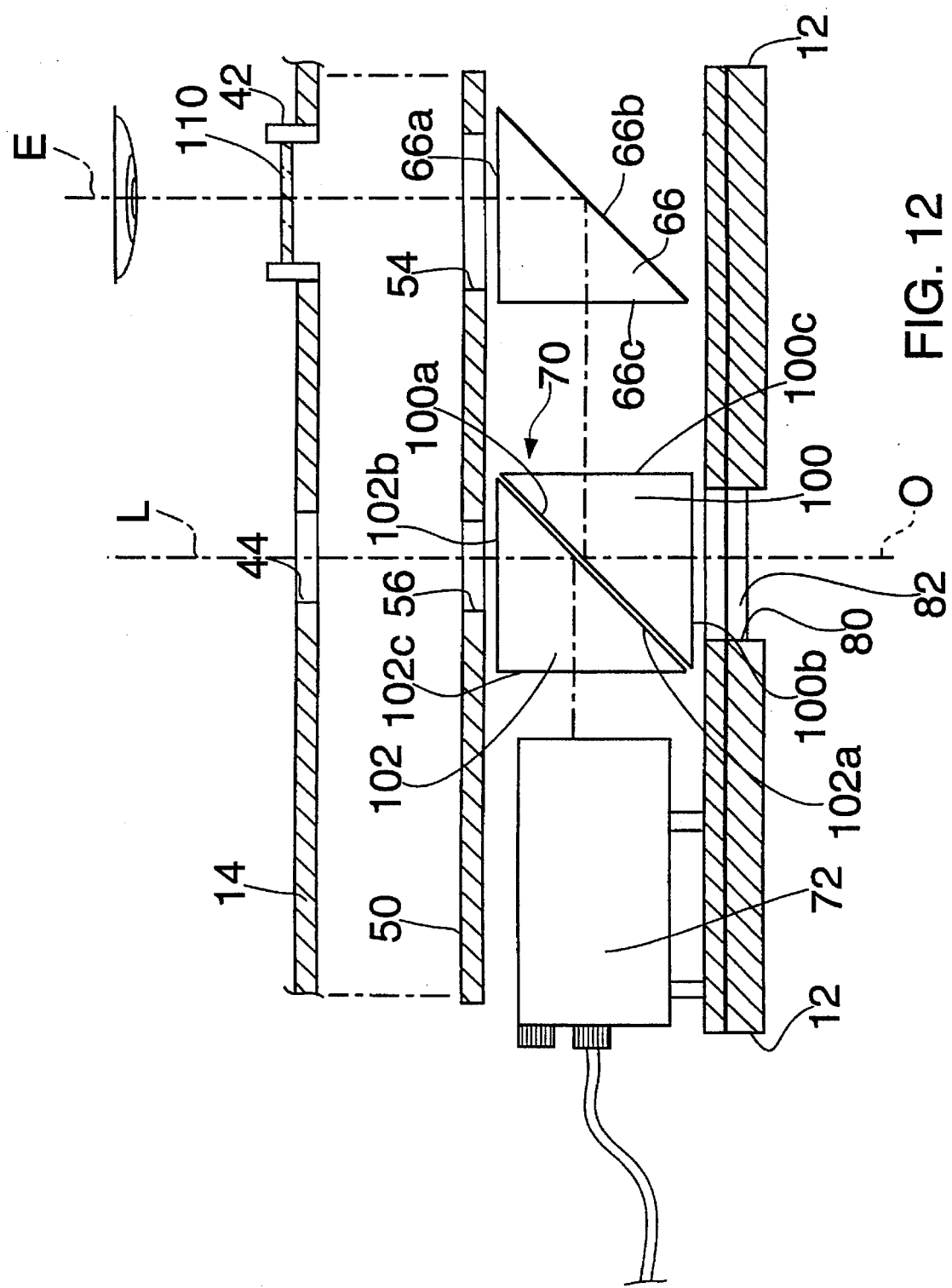
FIG. 12 is a schematic diagram of an optical viewing system and a light beam source in the MRTI of FIG. 7.

A double prism assembly 70 is mounted inside the frame member 50 in alignment with the light beam opening 56, and with a central viewing opening 80 formed through the center of the base 12 as shown in FIG. 6. Further details of the double prism 70 are shown in FIG. 9. Like the eyepiece prism 66, the dual prism assembly 70 is aligned inside the frame member 50 by way of a pair of conical screw members supported by the side walls of the member 50, and by a set of four retaining screws with lock nuts arranged about the light beam opening 56 (see FIG. 2). A laser beam source 72 is mounted inside the frame member 50 at the left end of the member as viewed in FIG. 3. Further details of the beam source 72 are shown in FIGS. 5, 7 and 12.

Figure 4:
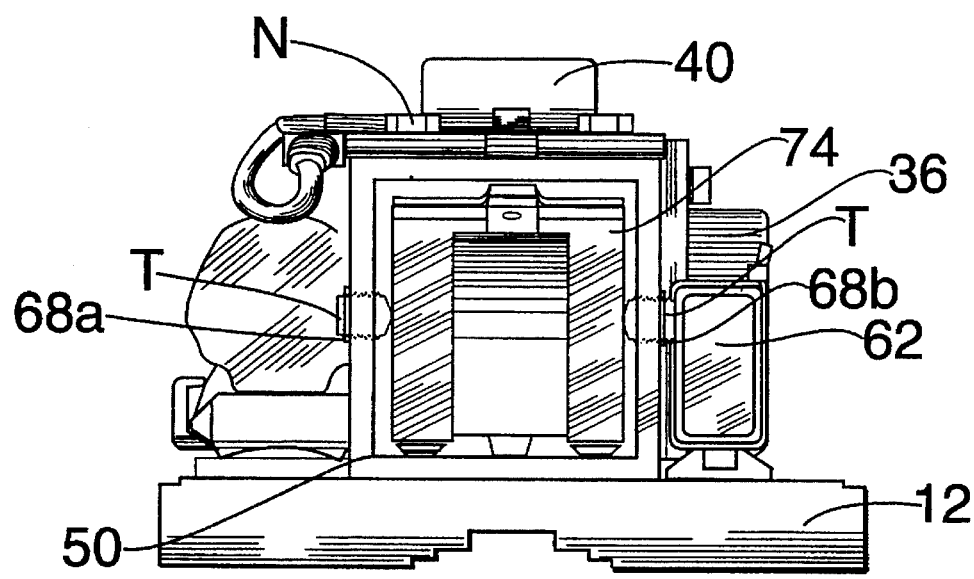
FIG. 4 is a left-end view of the instrument in FIG. 2.

FIG. 4 is an end view of the platform base 12 as seen at the left in FIG. 2, and FIG. 5 is an end view of the platform base as seen at the right. An eyepiece prism holder 74 is seen in FIG. 4, and a rear end wall 76 of the laser beam source 72 appears in FIG. 5. The mounting alignment screws T for the eyepiece prism holder 74, also appear in FIG. 4.

FIG. 6 is a plan view of the platform base 12 showing its bottom surface 86. A viewing opening 80 is bored through the center of the base 12, and a field viewing glass 82 having an etched cross-hair reticle 84 is mounted in the circumference of the opening 80. In the present embodiment, opening 80 has a diameter of about 1.485 inches.

The field viewing glass 82 is recessed from bottom surface 86 of the base 12 so as to allow clearance for a linear tape measure (not shown) through sets of guide slots machined in the base 12. Indicia on the tape measure then can be seen against the cross hairs of the reticle 84, when looking through the instrument eyepiece 42.

In the present embodiment, the base 12 comprises an aluminum plate measuring about 6.75" long by about 4" wide, and 0.5" inch thick. A first long tape measure groove 88a of about 0.441 inches width is milled to a depth of about 0.275 inches below the bottom surface 86, symmetric with the long center line of the rectangular base 12. A first transverse tape measure groove 88b is milled to the same depth below the base bottom surface 86 symmetrically with the transverse center line of the base 12. A second long tape measure groove 90a and a second transverse tape measure groove 90b are milled to a depth of 0.125 inches below the bottom surface 86, symmetric with the long and the transverse center lines of the base 12, thus forming a first step between the first and the second grooves 88a, 90a and 88b, 90b. The width of the second grooves 90a, 90b is about 0.755 inches which will allow a conventional ¾ inch wide tape measure to rest firmly on the first step.

A third long tape measure groove 92a and a third transverse tape measure groove 92b, each 1-inch wide, are milled to a depth of about 0.063 inches below the base bottom surface 86 thus forming a second step between the second and the third sets of tape measure grooves 90a, 92a and 90b, 92b. A conventional one inch wide tape measure thus can rest on the second step. Measurement markings on a tape measure can then be referenced through the viewing glass 82 when the instrument 10 is in use, as explained below.

FIG. 7 is a perspective view of the instrument interior with parts of the frame member 50 broken away, so as to show instrument components mounted within.

In the present embodiment, frame member 50 is an extruded 6061-T6 aluminum channel measuring about 6-⅜ inches long and having a square cross section 1-¾ inches on a side. The member 50 is seated on the top surface of the instrument base 12 within a recess measuring 1.750 inches wide and about 0.030 inches deep. Frame member 50 is fixed to the base 12 with mounting screws S at regular intervals through its bottom wall. The eyepiece prism 66 is mounted in its holder 74 at the left end of the member 50 as viewed in FIG. 7, beneath the eyepiece opening 54 in the top wall 52b. The prism 66 and its holder 74 (see FIG. 8) are fixed inside the member 50 by the four retaining screws through the top wall, after the prism 66 is pivoted to align with the double prism assembly 70 at the center of the frame member. A viewing surface 66a of the prism 66 faces the eyepiece opening 54.

The double prism assembly 70, shown in greater detail in FIG. 9, comprises an optical reflecting prism 100 and a laser reflecting prism 102. The backs of reflecting surfaces 100a, 102a of the prisms face one another, and the prism assembly 70 is fixed in place by retaining screws through the top wall 52b of the frame member 50 after the assembly 70 is aligned about pivot screws in the side walls 52a. A viewing field surface 100b of the prism 100 thus faces in the direction of the instrument viewing opening 80, and a light beam emitting surface 102b of the prism 102 faces in the direction of the light beam opening 56. Accordingly, the prisms 66, 100 define parts of an optical viewing system that will enable a user to view an object along an optical view axis coaxial with the viewing opening 80, upon looking through the glass eyepiece 42 on the instrument cover 14.

The laser source 72, shown at the right end of the frame member 50 in FIG. 7, is fixed on the base 12 via a dovetail base mount arrangement M and is aligned to direct a beam of light on a beam incident surface 102c of the prism 102. Accordingly, a beam of light from the source 72 incident on the prism surface 102c is reflected off surface 102a, and directed through the light beam opening 56. An important feature of the present instrument 10 lies in that the axis of the light beam, which exits through the beam opening 44 on top of the instrument cover 14, can be aligned parallel to, and brought coincident with the axis of the optical viewing system through the view glass 82 on the bottom of the instrument base 12. The view axis may be defined by the reticle 84 which is seen by the user when looking through the eyepiece 42.

The combined optical viewing system and light beam emitting optics of the instrument 10, are represented in FIG. 12.

FIG. 12 is a schematic diagram of optical components housed in the present instrument 10. The frame member 50 is shown in cross-section in FIG. 12, and as viewed from the rear in FIGS. 2 & 7. A portion of the instrument cover 14 is shown in FIG. 12, including the eyepiece 42 comprised of a glass piece 110 aligned above the opening 54 in the frame member 50. When viewing with the eye along axis E, object light is reflected off reflecting surface 66b of the eyepiece prism 66, normally through the viewing surface 66a of the prism and through the glass 110 of the eyepiece 42. The object light enters prism 66 normal to a light incident surface 66c, in the direction of the axis of frame member 50. The object light travels from an object below the frame member 50 as viewed in FIG. 12, along a view axis 0 through the viewing opening 80 in the instrument base 12, a bottom viewing opening in the frame member 50, and the reflecting prism 100.

Specifically, light from the object along the axis 0 is incident on a viewing field surface 100b of the prism 100, and is reflected at a 90 degree angle from reflecting surface 100a. Object light reflected by the surface 100a exits normally from surface 100c of the prism 100, and is incident on the surface 66c of the eyepiece prism 66.

The laser beam source 72 is adjusted so that when energized, the source 72 directs a collimated, coherent light beam normal to the beam incident surface 102c of the laser reflecting prism 102. The light beam enters the prism 102 along the direction of the long axis of the frame member, and is reflected upwardly at a 90 degree angle from the reflecting surface 102a of the prism 102. The light beam exits the prism 102 normally to the emitting surface 102b of the prism in the direction of axis L, through the light beam opening 56 and out from the opening 44 in the instrument cover 14. The optical components of the instrument 10 are mounted and aligned in the frame member 50 so that the view axis 0 can be aligned parallel to and brought coincident with the light beam axis L.

When the prisms 66, 100, 102 and the laser source 72 are set and aligned so that the view axis 0 and the light beam axis L are parallel to one another, it becomes possible for the user to sight or establish a reference mark on a surface over which the MRTI is positioned, with respect to a reference point directly vertically above the instrument 10 (for example, on a ceiling above the instrument). Such a reference point transferring operation is carried out by leveling the MRTI 10 using the bull's eye level 40 mounted horizontally on top of the frame member 50. The laser source 72 is then energized so as to cause a light beam to be directed vertically upwardly and the MRTI is positioned in a level horizontal plane until the laser beam spot is on the overhead reference point. The user then looks through the eyepiece 42 and marks a spot on the floor as defined by the reticle 84. Some examples of practical uses for the MRTI 10 are set out below.

FIG. 13 is a schematic block diagram showing wire cable routing and connections between electrical switches, lamps and other components on the instrument base 12, frame member 50 and the instrument cover 14.

Jack connector 24 is provided for connection to a battery charger (not shown). A ground portion of the connector 24 contacts the body of the instrument cover 14 and connects via a ground wire 130 to a ground part of the jack connector 22. Connector 22 is provided for connection with an external power supply, for example, a nicad battery pack. A SPDT slide switch 132 has a common terminal connected to lead 134 which terminates in a cable connector pin 134a. Another connector pin 134b is connected to the ground wire 130. The jack connector 24 has its center or insulated terminal connected via lead 24a to a charge terminal C of the switch 132. The center or insulated terminal of the connector 22 connects to a battery terminal B of the switch 132. The connector pins 134a, 134b mate with a connector on a length of flexible leads that connect to the terminal block 64 (ee FIG. 5).

Internal battery 62 is mounted on the instrument base 12 on the side of the frame member 50 opposite the terminal block 64. Battery 62 is connected via leads 136 to the laser drive 60 and to terminals on the terminal block 64 adjacent the laser drive 60. The touch switch 58 mounted on the top wall of the frame member 50, is connected via leads 138 to the laser drive 60 and actuates the laser drive in response to depression of the switch 58 by the operating knob 46. The laser drive 60 is coupled to the laser source 72 via a drive cable 140.

A dial lamp 142 is provided at a point on the circumference of the level viewing opening 34 on the side panel 30 of the instrument cover 14, as shown in FIG. 1. The lamp 142 is connected by leads 144 to the terminal block 64 and, together with a second dial lamp 146 provided at a point on the circumference of the instrument viewing opening 80 (see FIG. 6), is illuminated upon closing of a lamp switch 148 on the cover 14. The lamp 146 is connected to terminals of the switch 148 via lamp leads 146a. Terminals of the switch 148 are also connected to a switch bus 150a that is routed inside the instrument cover 14. The switch bus 150a is connected via mating pin connectors to a power lamp bus 150b having leads that connect with the first lamp 142 and the terminal block 64.

Figure 10:
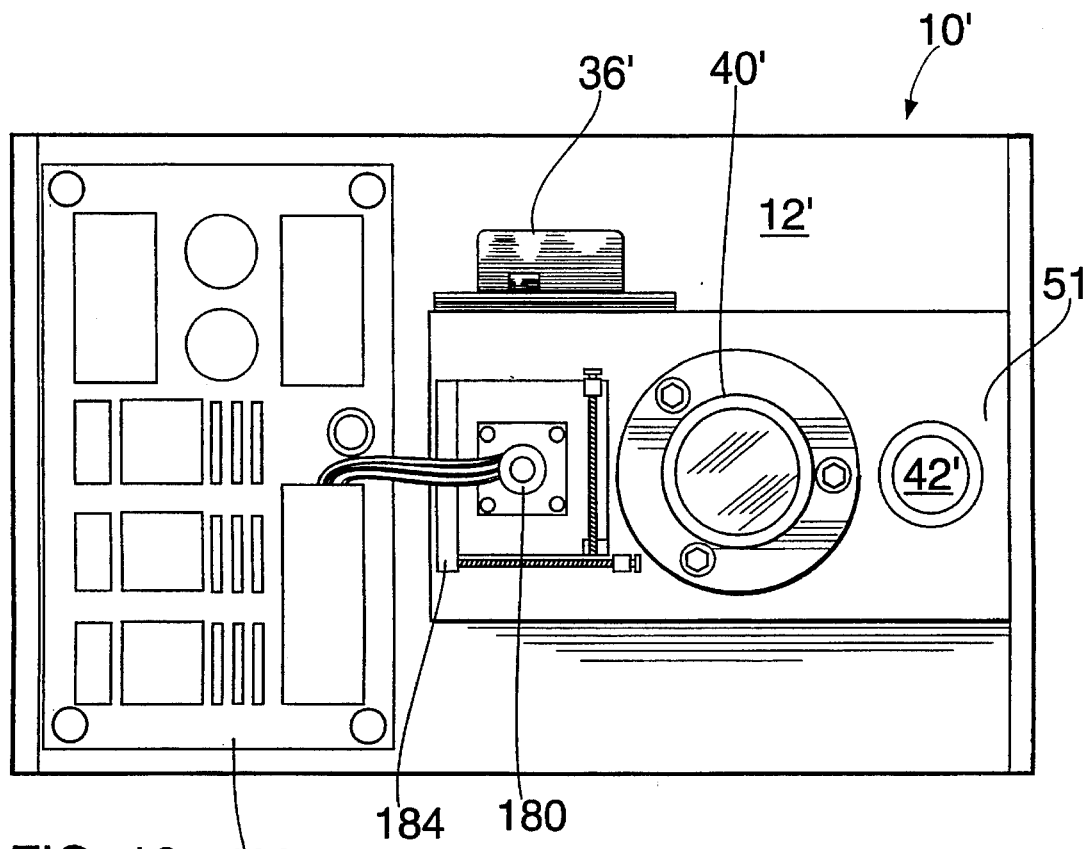
FIGS. 10 and 11 show an alternative embodiment of the MRTI.
Figure 11:
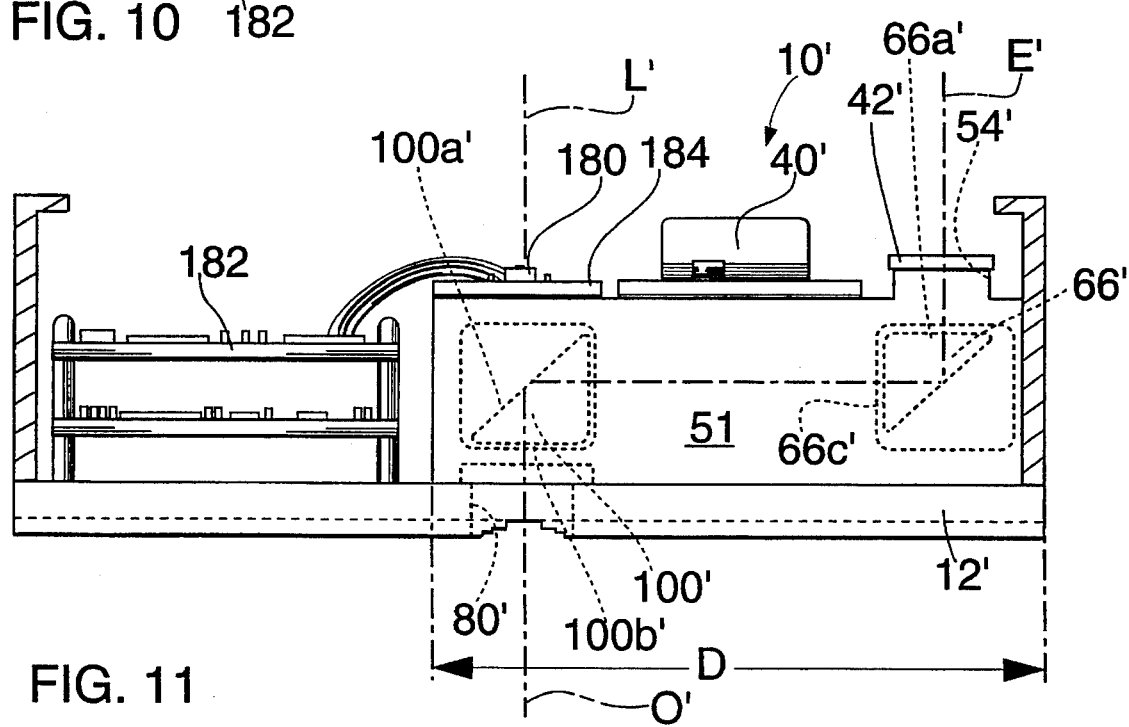

FIGS. 10 and 11 show an alternate embodiment of a measurement referencing and transferring instrument 10' according to the invention. Components that are the same or similar to those described above are indicated by corresponding reference characters.

A box or square-section frame member 51 is fixed on the instrument base 12' beginning at the right of the base and extending toward the left as viewed in FIG. 11, by a length D, just beyond the circumference of the base viewing opening 80'. Frame member 51 has an opening through its bottom wall in alignment with the viewing opening 80'. A first bull's eye level 36' is mounted on a vertical side wall of the frame member 51, and a second bull's eye level 40' is mounted on the horizontal top wall of the frame member. An eyepiece opening 54' is formed through the top wall of the frame member 51, in line with eyepiece prism 66'. When the user looks through the eyepiece 42' normal to viewing surface 66a' of prism 66' and along a view axis E', an object below the base 12' in line with view axis 0' can be observed by the user. Light from the object entering the viewing opening 80' along axis 0' normal to a view field surface 100b' of reflecting prism 100', is reflected at a 90 degree angle from reflecting surface 100a' and is incident on surface 66c' of the eyepiece prism 66'.

The eyepiece prism 66' and the reflecting prism 100' are mounted within the frame member 51 in a manner similar to the mounting of the prisms 66, 100 in the first embodiment. Accordingly, the optical viewing system, from the instrument eyepiece 42' to the view opening 80' through the instrument base 12', may be identical with that of the first embodiment described above.

An important feature in the embodiment of FIGS. 10 & 11 lies in the provision of a laser diode 180 and associated drive circuitry 182, in place of the laser source 72, drive unit 60 and laser reflecting prism 102 in the first embodiment. Laser diode 180 is mounted on a support plate assembly 184 that permits alignment of the diode 180 within a plane parallel to the top wall surface of the frame member 51. When energized, the diode 180 emits a collimated beam of coherent light upwardly along light beam axis L'. In accordance with the invention, the support plate assembly 184 and the laser diode 180 are arranged so that the light beam axis L' can be aligned parallel to, and be brought coincident with, the optical view axis 0'. Eliminating the laser reflecting prism 102 and associated alignment structure of the first embodiment, facilitates the initial calibration and set-up of the instrument 10'.

Figure 14A:
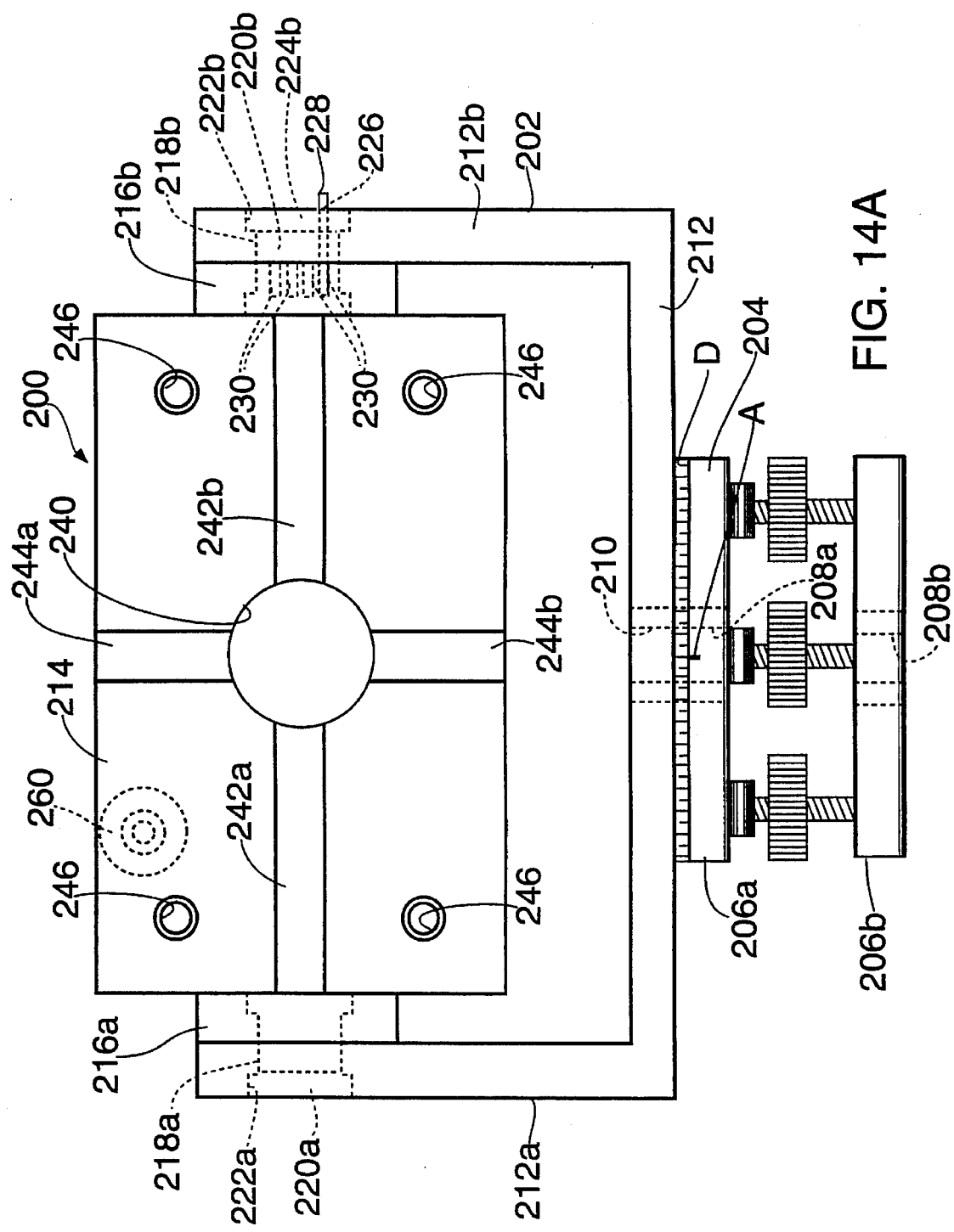
FIGS. 14A and 14B are views of a mounting plate and tribrach arrangement for enabling the MRTI to be swiveled in azimuth and in elevation when mounted atop a tripod.
Figure 14B:
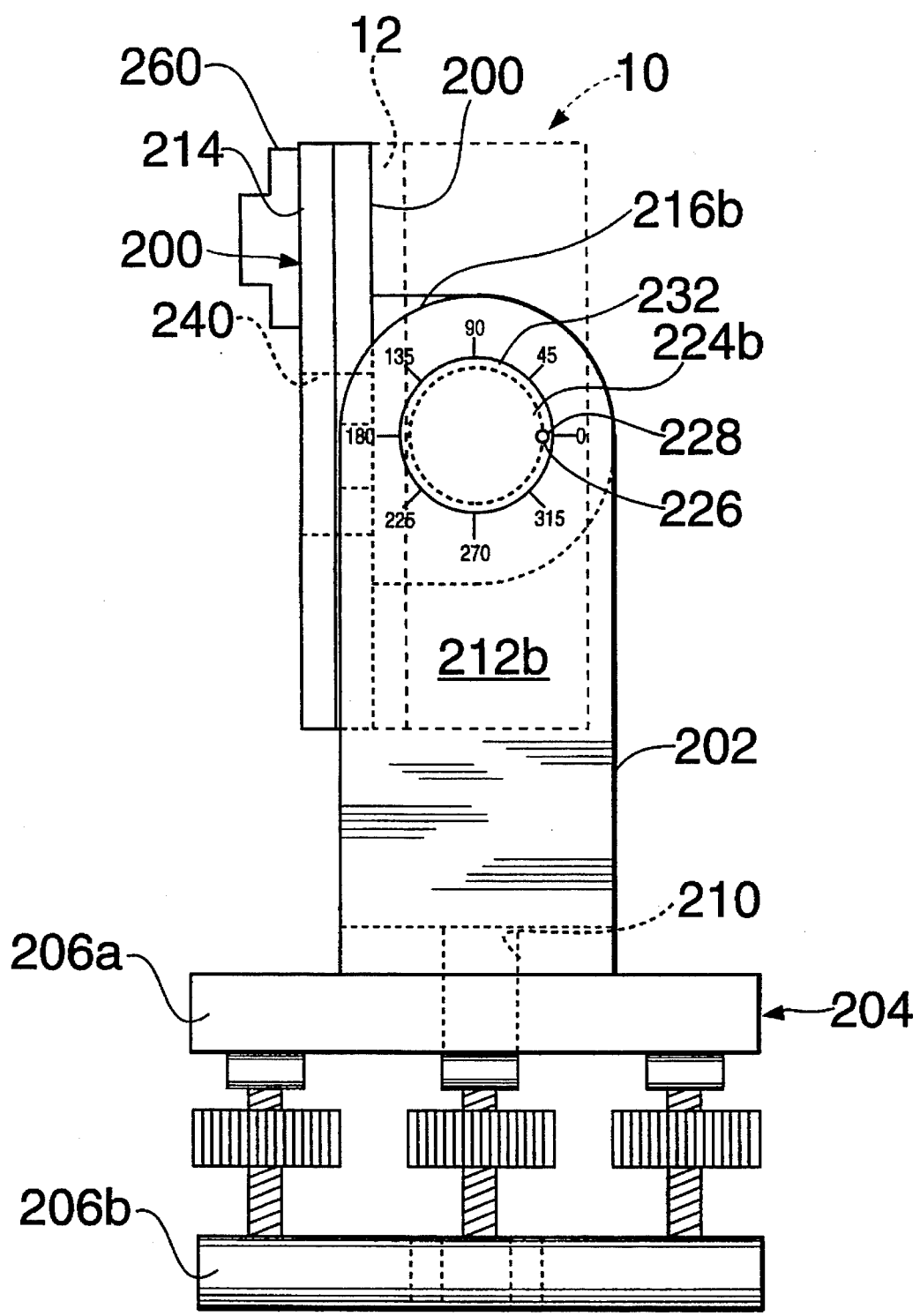

FIGS. 14A and 14B show a mounting plate 200 mounted for swiveling movement about a horizontal axis, on a mounting bracket 202. The bracket 202 is mounted for swiveling movement about a vertical axis on a tribrach 204, with a 360 degree azimuth angle indicating dial. The tribrach 204 is, in turn, adapted to be fixed atop a tripod (not shown). The tribrach 204 has a circular upper plate 206a and a lower plate 206b each having a central opening, 208a, 208b. A base 212 of the mounting bracket has a third central opening 210.

The mounting bracket 202 also has a pair of vertically extending end arms 212a, 212b thus giving the mounting bracket 202 a "U"-shaped configuration. The base 212 is fixed to a circular dial plate D having azimuth angle markings on its outer periphery and an opening at its center concentric with the opening 210 in the mounting bracket base 212. The dial plate is mounted at its central portion for rotation over the upper plate 206a of the tribrach 204. An angle indicator mark A on the circumference of plate 206a indexes an azimuth angle reading against the angle markings on the circumference of the dial plate. The mounting bracket base 212 is supported to swivel about the vertical axis of the openings 210, 208a, 208b with substantially zero side play.

The mounting plate 200 also comprises a base part 214 and a pair of ears 216a, 216b at opposite ends of the base part 214 for swiveling on the end arms 212a, 212b of the mounting bracket 202. Specifically, the mounting plate ears 216a, 216b each pivot about suitable bearings 218a, 218b through the bracket end arms 212a, 212b, as shown in FIG. 14A. Stem parts 220a, 220b of the bearings are fixed to the mounting plate ears 216a, 216b and pivot together with the mounting plate 200 about a horizontal axis through the end arm bearings. The heads of the stem parts 220a, 220b are captured within corresponding recesses 222a, 222b in the bracket arms and rotate inside the recesses when the mounting plate 200 is swung.

As shown in both FIGS. 14A and 14B, head part 224b has a pin opening 226 through a point near its circumference for receiving a position detent pin 228. A number of detent openings 230 are drilled near the circumference of recess 222b in the bracket ear 212b, and a 360 degree angle scale 232 is marked about the circumference of the recess 222b, as shown in FIG. 14B. The angle scale 232 is marked so that when base part 214 of the mounting plate 200 is swung to a position in a vertical plane as shown in FIG. 14B, the pin opening 226 is aligned with the "zero" angle mark of the scale and with a corresponding detent opening 230 in the bracket arm 212b.

Inserting the detent pin 228 through the openings 226, 230 at the "zero" degree mark will thus lock the mounting plate base part 214 in the vertical position, as will insertion of the pin 228 through the openings 226, 230 when the base part 214 is swung 180 degrees from the position shown in FIG. 14B. Likewise, the base part 214 can be locked in a horizontal plane when the pin opening 226 is aligned with the 90 and the 270 degree marks, and the pin 228 is inserted in the opening 226 and the corresponding detent opening 230 in the bracket arm 212b. Additional detent openings 230 may be provided in, for example, 22.5 degree intervals to enable the base part 214 of the mounting plate 200 to be swiveled and locked at a certain desired elevation angle.

The base part 214 of the mounting plate 200 has a central view relief opening 240, and raised rectangular locating lands 242a,242b and 244a,244b for engaging the tape measure grooves 88a, 88b in the bottom side of the instrument base 12 (see FIG. 6). When the instrument base 12 is seated on the lands of the mounting plate base part 214, the relief opening 240 through the base part is aligned with the instrument viewing opening 80. The instrument is fixed on the mounting plate 200 by a set of four screw members inserted through openings 246 in the base part 214, to engage the threaded openings 20 in the bottom of the instrument base 12.

With the instrument 10 (or 10') fixed on the mounting plate 200 and swiveled in elevation to a 270 degree position in FIG. 14B, the light beam opening 44 in the top of the instrument cover 14 will face downwardly to align with the central opening 210 in the mounting bracket 202, and with openings 208a, 208b in the tribrach plates 206a, 206b. When placed in such a position, the instrument 10 can direct a light beam vertically downward so as to enable plummeting of the instrument, for example, when mounted on a tripod over a ground reference mark. A bull's eye level vial 260 is fixed on the back surface of the base part 214 to aid in leveling the MRTI for accurate plummeting.

Figure 15:
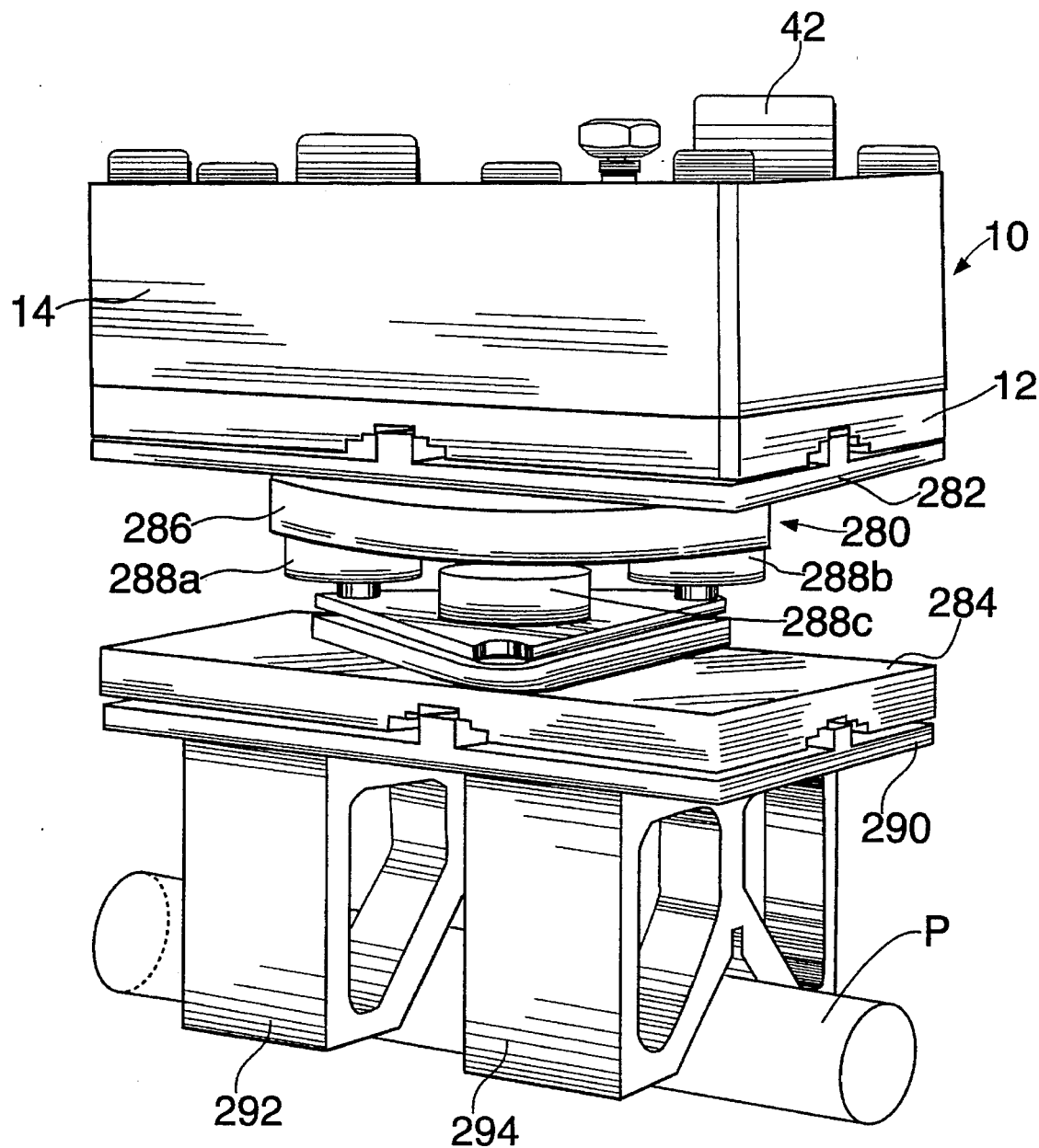
FIG. 15 is a view of a second tribrach arrangement for enabling the MRTI to be leveled atop a work surface or while resting on a pipe.

FIG. 15 shows a second tribrach arrangement for enabling the instrument 10 to be leveled atop a work surface, or while resting on a cylindrical member such as a pipe P.

The instrument 10 is set on a second tribrach assembly 280, the latter comprising an upper plate 282 and a lower plate 284. The plates 282, 284 are fixed on top and bottom surfaces of a three-thumbwheel leveling mechanism 286. The lower plate 284 has tape measure grooves cut symmetrical with the long and the transverse center lines of the bottom surface, like those in the bottom surface 86 of the instrument base 12 (see FIG. 6). The tribrach assembly 280 also has central openings (not shown) in the upper and lower plates 282, 284 which openings are in line with the viewing opening 80 in the instrument base 12 shown in FIG. 6.

Accordingly, if the instrument 10 is positioned atop a work surface that is not level, the instrument 10 with the tribrach assembly 280 can be brought level in a horizontal plane after the lower plate 284 is set on the work surface and the instrument 10 is leveled via the thumbwheels 288a–c of the leveling mechanism 286. When looking through the instrument eyepiece 42, the user will be able to sight an object in line with the central opening in the lower plate 284, including tape measure markings in the field of the central opening when a tape measure (not shown) is seated in the mentioned grooves.

A V-block base plate 290 is fixed on a pair of conventional V-blocks 292, 294. The V openings of each block face downward with the sides of the openings co-planar with one another. The top surface of the base plate 290 has elongate rectangular lands projecting from its top surface, for seating in sets of tape measure grooves cut in the bottom surface of the lower plate 284. That is, the base plate 290 is similar in shape and form to the base part 214 of the mounting bracket 202 in FIG. 14A.

The base plate 290 with the V-blocks 292, 294 and the tribrach assembly 280, together enable the instrument 10 to be leveled in a horizontal plane in applications where a reference mark is to be established on the surface of the pipe P, or other cylindrical member on which the V-blocks 292, 294 can rest.

Direct Measurement Referencing and Transferring

Using either of the base plates 12, 284, the MRTI 10 can accept and accommodate a variety of standard tape measures thereby accomplishing accurate measurement or point-to-point referencing, and enabling a reference point to be transferred to or from a location some distance away.

Using the base plate 12 and other base plates herein disclosed, the MRTI 10 provides features necessary in the performance of many trades; e.g., iron workers, pipe fitters, drywailers, civil engineers, machinists, millwrights, and the like. Although the MRTI 10 is suited for accurate measurement referencing and transferring for all the trades, such is not the only area of use for the instrument.

Laser/Optical Alignment

Applying the instrument 10 to current laser/optical construction technology enables a person to align, for example, wall studs, columns, or machinery. Further, an electronic leveling system that can align the instrument 10 in both vertical and horizontal planes with equal precision, can be built into the instrument so as to enhance its performance as a useful laser/optical alignment tool. Once set up on a tripod with the mounting plate 200, bracket 202 and tribrach 204 (see FIGS. 14A and 14B), the instrument 10 can be used much the same as other existing construction laser/optical alignment instruments, for edging -to- beam types of alignment. The mounting arrangement of FIGS. 14A and 14B can also be used for laser/optical leveling with the instrument 10.

Laser/Optical Leveling

The mounting plate 200 and associated mounting structure enable the instrument 10 to be useful as a leveling laser. The mount can fit tripod bases common to all surveying instruments, and the configuration of the present instrument 10 lends itself well for use on survey tripods currently on the market. In addition to ordinary tripod leveling, the MRTI 10 can combine its compact shape, angle finder, and a magnetized version of the V-block base plate 290, to expand its use in leveling applications.

Laser/Optical Plummeting

Plumb bobs are accurate and inexpensive for indoor work. Although the MRTI 10 is not intended to replace plumb bobs, it can act as an accurate plummeting tool. Significantly, the MRTI 10 can perform measurement work not only from air to ground, but from ground to air as well. The latter cannot be done by a conventional weighted plumb bob. Plummeting may be achieved, for example, with the V-block base plate assembly shown in FIG. 15 as well as with the tripod mount arrangement of FIGS. 14A and 14B.

Angle Finding Measurement

Using the tribrach assembly 280 having the lower base plate 284, the MRTI 10 can provide a user with an accurate angle measurement within one-quarter of a degree. This is accomplished by placing the MRTI 10 on the surface defining the angle to be measured (pipe, beam, rail, board, or ledge) using the V-blocks 292, 294 if necessary, and taking a direct angle read-out on the scale of the angle finder 32.

When the MRTI 10 is assembled, it must of course perform its functions with a prescribed accuracy. That accuracy is largely dependent upon the laser source as well as the manufacturing tolerances.

The laser source and its drive unit should be waterproof, shockproof, durable, and not require much power to operate. A laser beam spot size of ½" has been obtained at 100 yards, using a gallium arsenide, Class 1 rated laser. Lasers are rated in terms of power output, and those rated above Class 3 require the user to have a special license. Lasers rated Class 1 through Class 3 would be suited for use in the MRTI. Laser technology is advancing rapidly and lasers are getting smaller and more powerful. Lasers above Class 3 are used for welding, cutting, etching, surgery, defense and many other uses; and as they are very powerful they are unsuitable for the present application.

If a Class 3 rated laser is used in the MRTI, it would give the instrument better prescribed accuracy along with a beam line which is easier to see and use, especially in bright light. A problem with smaller Class 1 lasers is that in bright sunlight, the beam line diminishes in intensity and becomes hard to see and use. Ultimately, a Class 3 rated laser would work best in the MRTI, if overall instrument size, reliability, and affordability are not compromised.

In yet another embodiment of the MRTI, the laser source may be replaced with a pure, high-magnification scope (optics) such as the type found in surveying transits, levels, and theodolites. It will be understood that the MRTI 10 will also perform its various tasks with a pure optics construction, in lieu of the laser components. The benefits of a purely optical version would be optical magnification of the remote reference point—much like looking at the point of reference through a pair of binoculars; and could provide at least comparable accuracy and versatility as does the laser version.

A notable problem in using a high magnification scope instead of the laser source in the MRTI 10, is the amount of available light inside factories. Another problem is a phenomenon called parallax. Parallax is caused by incorrect operator focusing, manufacturing inaccuracies, and problems in orientation. These problems along with the fact that a purely optical version of the MRTI 10 requires many more moving parts which, if bumped, would be more prone to breakage or misalignment, and collimation difficulties as well, tend to weigh in favor of using a laser source in the MRTI.

The tape measure grooves allow a MRTI user to set the instrument on top of either a ½", ¾", or 1" tape measure and view direct measurements through the eyepiece 42 of the instrument. The lamp 146 affords extra illumination in the field of the view opening 80 in the event of use in a poorly-lighted location. A ring of plexiglass in the circumference of the view opening can be illuminated via the bulb 146, for enhanced viewability.

EXAMPLES OF USE OF THE MRTI 10

The following five examples describe how the MRTI 10 and attachments can be used in various applications. Although the examples deal mainly with millwright/pipefitting problems, the MRTI 10 can be used in the performance of daily tasks by, for example, plumbers, iron workers, carpenters, sheet metal tradesman, civil engineers, job superintendents, and drywailers.

EXAMPLE ONE

Direct Measurement Referencing and Transferring

Problem

A pipefitter is replacing an existing run of pipe 70 feet in the air with a new piping system.

Solution

By placing the MRTI 10 on the floor and using the tribrach assembly 280 (FIG. 15), the MRTI is leveled in the same manner one would level a transit. Once leveled, the MRTI then references the starting point of the piping system, e.g., a bend or a valve flange face, by directing a beam from the laser source vertically upward onto the chosen starting point. The user then transfers the starting point onto the floor by looking through the instrument eyepiece 42 and marking the floor where the cross-hairs of the reticle 84 intersect. Alternatively, using the mount arrangement of FIGS. 14A and 14B, the starting point of the piping system can be referenced with the instrument mounting plate 200 at a 90 degree vertical setting on the angle scale 232 after the instrument is leveled using the tribrach 204. After the starting point is referenced by activating the laser source to project a light beam onto the starting point of the piping system, the instrument is swiveled in elevation to the 270 degree mark on scale 232 and the laser source is turned on again, thus projecting the light beam directly downward. The starting point of the piping system is then referenced to a point defined by a light beam spot on the floor.

Next, the user walks to the end of the pipe run, or to a turn in the piping system such as an elbow. The mounting plate is set to the 90 degree elevation position and the user repeats the above leveling and referencing procedure, thus transferring a pipe end point onto the floor. The user then measures the length of the pipe run between the marked floor points with a tape measure. A replacement pipe is then fabricated, and the old section is cut and replaced.

EXAMPLE TWO

Laser/Optical Alignment

Problem

A drywall installer wants to install a new wall in an existing building. The new wall must be set straight at ten feet from an existing wall.

Solution

The MRTI is attached to the mount assembly of FIGS. 14A and 14B, and placed on a tripod. The instrument 10 is then leveled as one would level a transit or optical level. A 10-foot reference point from the existing wall is marked on the floor, the tripod is placed over the reference point, and the mounting plate 200 is swung in elevation to the 270 degree mark to allow the instrument 10 to be plumbed over the mark. The MRTI is then positioned at the 0 or 180 degree elevation position, and turned in azimuth to illuminate a pre-marked ten-foot reference point on a wall at the end of the new run, using the light beam spot from the laser source in the instrument. Wall studs are then installed and set vertically by lining them up with the edge of the laser beam which can be swung in elevation. The operation is otherwise similar to that performed by current dry wall lasers on the market.

EXAMPLE THREE

Laser/Optical Leveling

Problem

A millwright is building and installing a new machine which must be leveled to an existing machine located 200 feet away.

Solution

The MRTI is attached to the mount assembly of FIGS. 14A and 14B, and mounted atop a tripod that is located half-way between the new machine and the existing machine. The MRTI is leveled as one would level a transit or optical level, using the bull's eye level 36 with the instrument 10 positioned at 0 (or 180) degrees elevation. The instrument laser beam is then directed to the existing machine. A measurement is taken on the existing machine between the beam spot and a selected reference point on the machine, e.g., the bottom of a flange lip which measures, say, 8 ½" below the laser beam spot.

The MRTI 10 is then swung 180 degrees in azimuth toward the new machine and a measurement is taken between the beam spot and the corresponding reference point on the new machine. The measurement may show, for example, that the bottom of the flange lip is 9 ¼" below the beam spot.

The millwright has then determined that the new machine must have a ¾" shim installed between the base of the new machine and the floor sole plate, in order to level the two machines with one another.

EXAMPLE FOUR

Laser/Optical Plummeting

Problem

A civil engineer is contracted to install a new piping system in a hospital were existing overhead lines may cause interference with the new system.

Solution 1

The MRTI 10 is used to plummet effectively from ground to overhead, by mounting the MRTI 10 on the tribrach assembly of FIG. 15 (without the V-blocks and base plate 290), placing the instrument and mount on the floor, and leveling the instrument using the thumbwheels 288a–c. The laser beam will be directed straight up, and the user can then determine were the best route for the new piping system runs by establishing corresponding reference marks on the floor through the instrument eyepiece 42, marking the points and measuring their distance from a wall, the existing lines, or other reference point.

Solution 2

The MRTI is mated with the mount arrangement of FIGS. 14A and 14B. The mounting plate 200 is attached to a tripod and the instrument first plummets upward, by using the laser beam to establish a clear route for the new piping system. The MRTI is then swung in elevation 180 degrees so the laser beam is directed toward the floor to act as a plumb bob. The user can then reference clear lines and transfer them to the floor.

EXAMPLE FIVE

Angle Finding Measurement/V-Block

Problem 1

A plumber/fitter must maintain a five degree incline on a six-inch roof storm drain line.

Solution

The user places the MRTI on top of the six-inch pipeline with or without the V-block mount 290. The line is inclined until the 5-degree scale mark on the angle finder 32 is indexed against the floating pointer 32a. The plumber/fitter then adjusts the pipeline hangers to maintain the desired five degree incline.

Problem 2

A boiler maker must determine the angle of a 2-inch high pressure steam line in order to fabricate a replacement line.

Solution

The user places the MRTI with or without the V-block mount 290, on the 2-inch pipe. A direct angle read out is then taken from the scale of the angle finder 32 indexed by the floating pointer 32a. The angle read is the angle of installation for a new 2-inch high pressure pipe.

The eyepiece 42 and components of the optical viewing path in the instrument 10, can also be such as to provide for a magnification in the order of two to four times, preferably with auto focus. This would allow for plummeting using the optical viewing system with the instrument 10 mounted on a tripod (with central view opening), and not require the instrument 10 to be swung downward on the mount arrangement of FIGS. 14A, 14B for laser plummeting.

A safety proximity (IR sensing) switch arrangement may also be provided to de-activate the laser source if the user's hand or head approaches the light beam opening 44 too closely.

Although no separate coating or material layer is shown at the interface between the backs of the reflecting surfaces of the prisms 110, 102, it may be desirable for safety purposes to paint the prisms black and/or include a dark material between the surfaces 100a, 102a. Also, some or all of the prisms disclosed hereinabove may be replaced with suitable mirrored reflecting elements. Moreover, the V-blocks 292, 294 may be magnetized to provide more stability, when the blocks with the mounting plate 290 are set on a metallic pipe.

Figure 16:
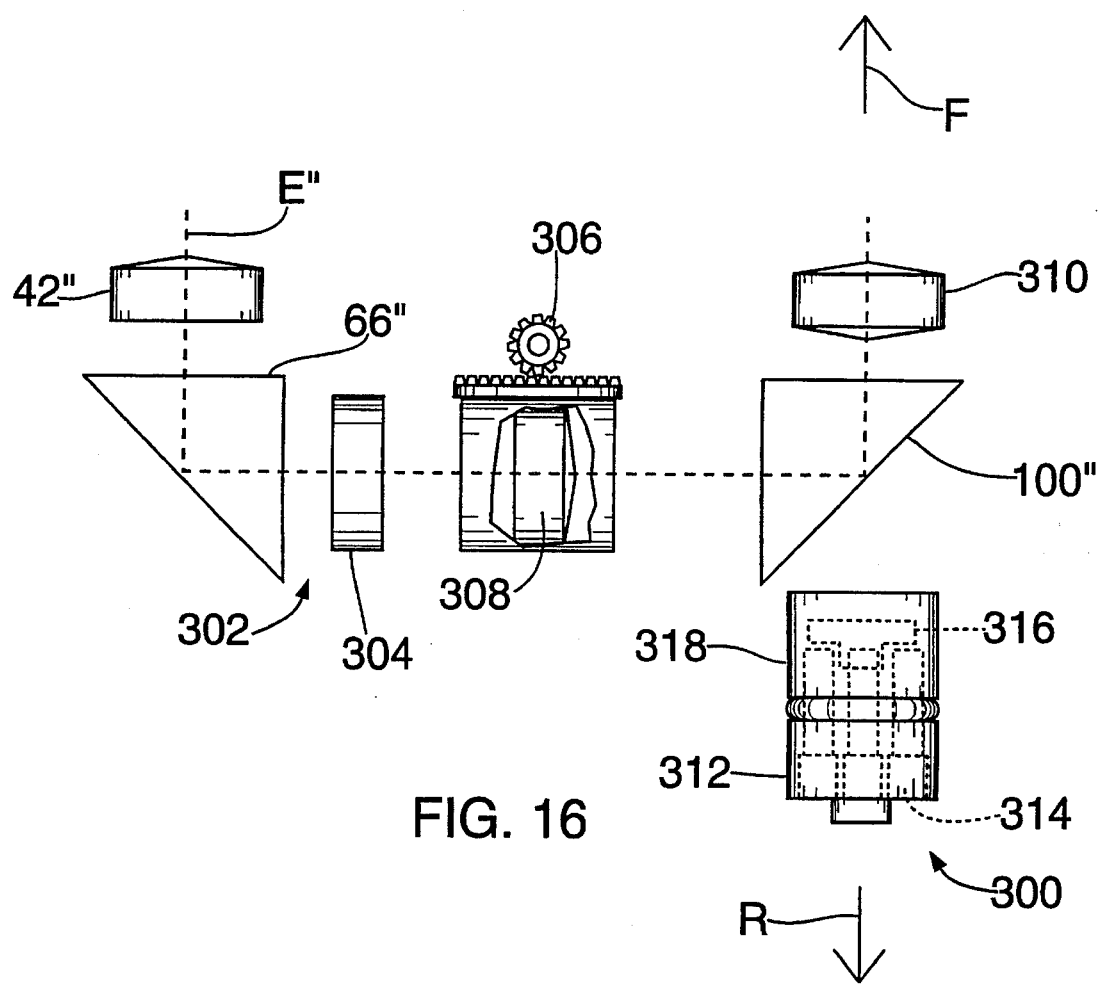
FIG. 16 is a schematic diagram of another embodiment of the MRTI having magnified optics and laser sighting arrangements with associated prisms.

FIG. 16 is a diagram of another embodiment of the MRTI using an optical viewing system and a light beam source. The optical configuration differs from that of the embodiment in FIG. 11, by the use of a laser diode assembly 300 as a means for emitting a light beam directly along axis R to mark a reference point along reference axis R, and in the use of a magnified optics arrangement 302 to allow sighting of a selected point in the field along viewing axis F.

The magnified optics arrangement 302 may be similar to those found in existing optical levels, transits and theodolites. The optics include the eyepiece lens 42", the prism 66", a reticle 304, a focus assembly 306 including focus lens 308, the field prism 100", and a field lens 310. In use, the user would sight an image of the selected point in the field along the axis F, through the eyepiece lens E". The distant image of the selected point is introduced through the field lens 310 and is transmitted through the field prism 100" which bends the image by 90 degrees. The image then passes through the focus assembly 306 wherein the focus lens 308 can be manually adjusted to focus the image of the selected point onto the reticle 304, after cross-hairs or other indicia of the reticle 304 have been brought into sharp focus by adjustment of the eyepiece lens 42". As in the embodiment of FIG. 11, the prism 66" deflects the image as passed through the reticle 304, by 90 degrees to exit through the eyepiece lens 42" for viewing. Provision is made so that the field viewing axis F associated with the magnified optics arrangement 302, and the reference axis R associated with the laser diode assembly 300, can be accurately adjusted to be parallel and coincident with one another by adjustment of a collimating cap 312 of the diode assembly 300. The collimating cap 312 is adjusted by way of screws 314 accessible from the front of the diode assembly 300, and serves to offset the angle of a light beam originating from a laser diode element 316 fixed in body part 318, to become parallel and coincident with the viewing axis F. See FIG. 24(b).

Further embodiments of the MRTI, all of which incorporate only light beam or laser configurations to carry out the measurement method of the invention, are now described.

Figure 17:
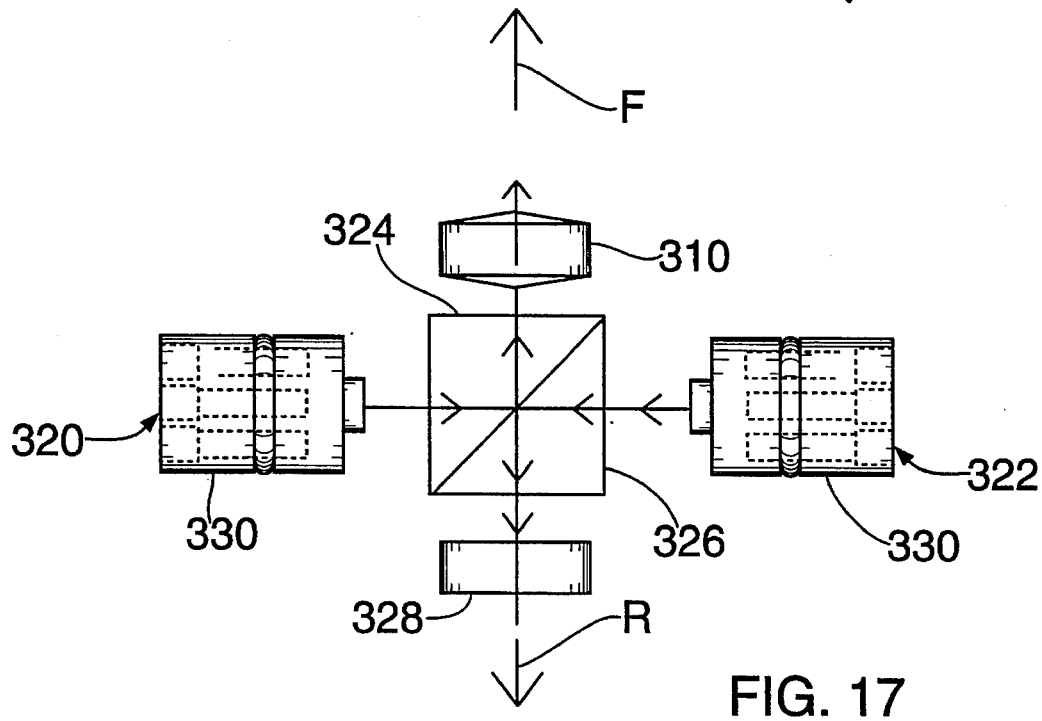
FIG. 17 is a schematic diagram of another embodiment of the MRTI having separate laser sighting modules with associated prisms.

FIG. 17 is a diagram of an embodiment of the MRTI using separate laser diode assemblies and associated prisms. In this embodiment, two separate and independently adjustable laser diode assemblies 320, 322 face corresponding field and reference prisms 324,326. The prisms deflect light beams originating from the diode assemblies 320, 322 in opposite directions along parallel field and reference axes F, R. As in the embodiment of FIG. 16, the field lens 310 receives light exiting the prism 324 and further condenses the light beam from the field laser diode assembly 320. Also included is a reference lens 328 arranged to receive light exiting the reference prism 326, and serving to focus the light originating from the reference diode assembly 322 over distances that may be close to the location of the MRTI. Both diode assemblies 320, 322 have rear-mounted collimating caps 328 for aligning axes F, R independently for greatest accuracy. See FIG. 24(a).

Figure 18:
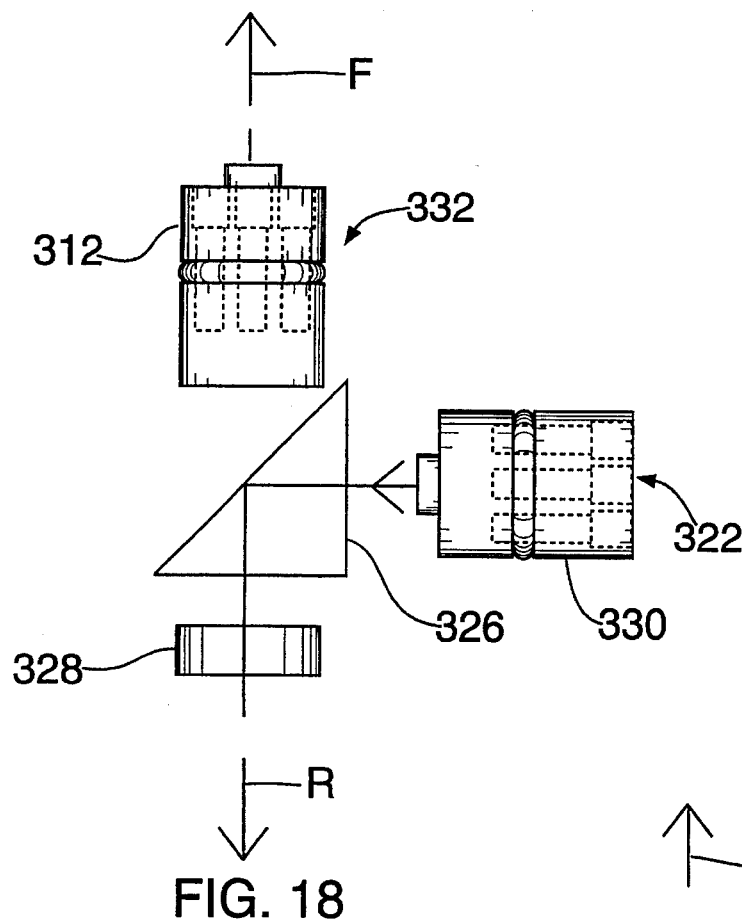
FIG. 18 is a schematic diagram of another embodiment of the MRTI having separate laser sighting modules.

FIG. 18 is a diagram of an embodiment using separate, independently adjustable laser diode assemblies, and only the reference prism 326. As in the embodiment of FIG. 17, prism 326 bends the light beam from laser diode assembly 322 by 90 degrees and directs the beam through the reference lens 328 along axis R. Thus, the reference beam may be focused on a reference point near the MRTI with the aid of the reference lens 328. Further, the reference beam along axis R may be aligned with a field beam emitted from laser diode assembly 332 along field axis F. Beam alignment may be effected by adjusting one or both of collimating caps 330, 312 of the corresponding diode assemblies 322, 332. Collimating cap 312 is mounted at the front of field laser diode assembly 332, and collimating cap 330 is mounted at the rear of the reference laser diode assembly 322. By using these two means of beam adjustment and alignment, light beams originating from the laser diode assemblies 322, 332 can be brought parallel and coincident with one another to achieve accurate alignment of the beams.

Figure 19:
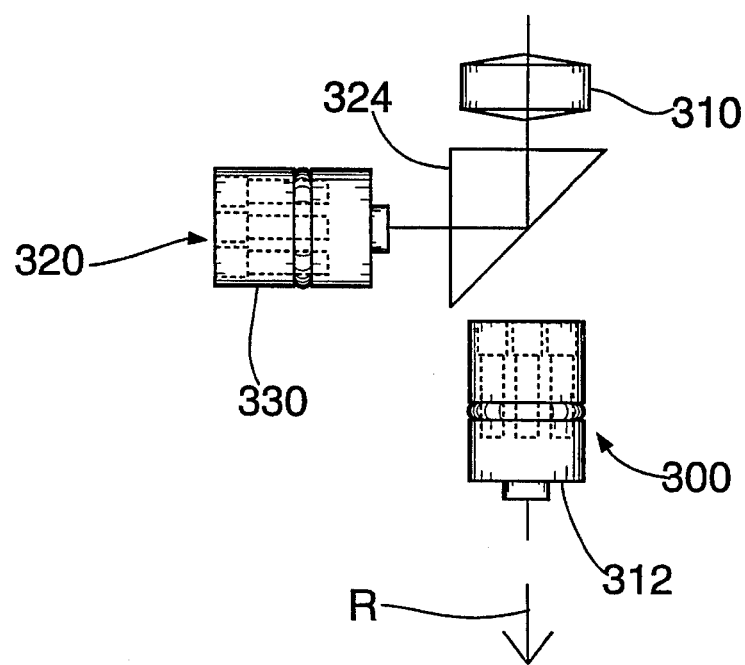
FIG. 19 is a schematic diagram of a further embodiment of the MRTI having separate laser sighting modules.
Figure 20:
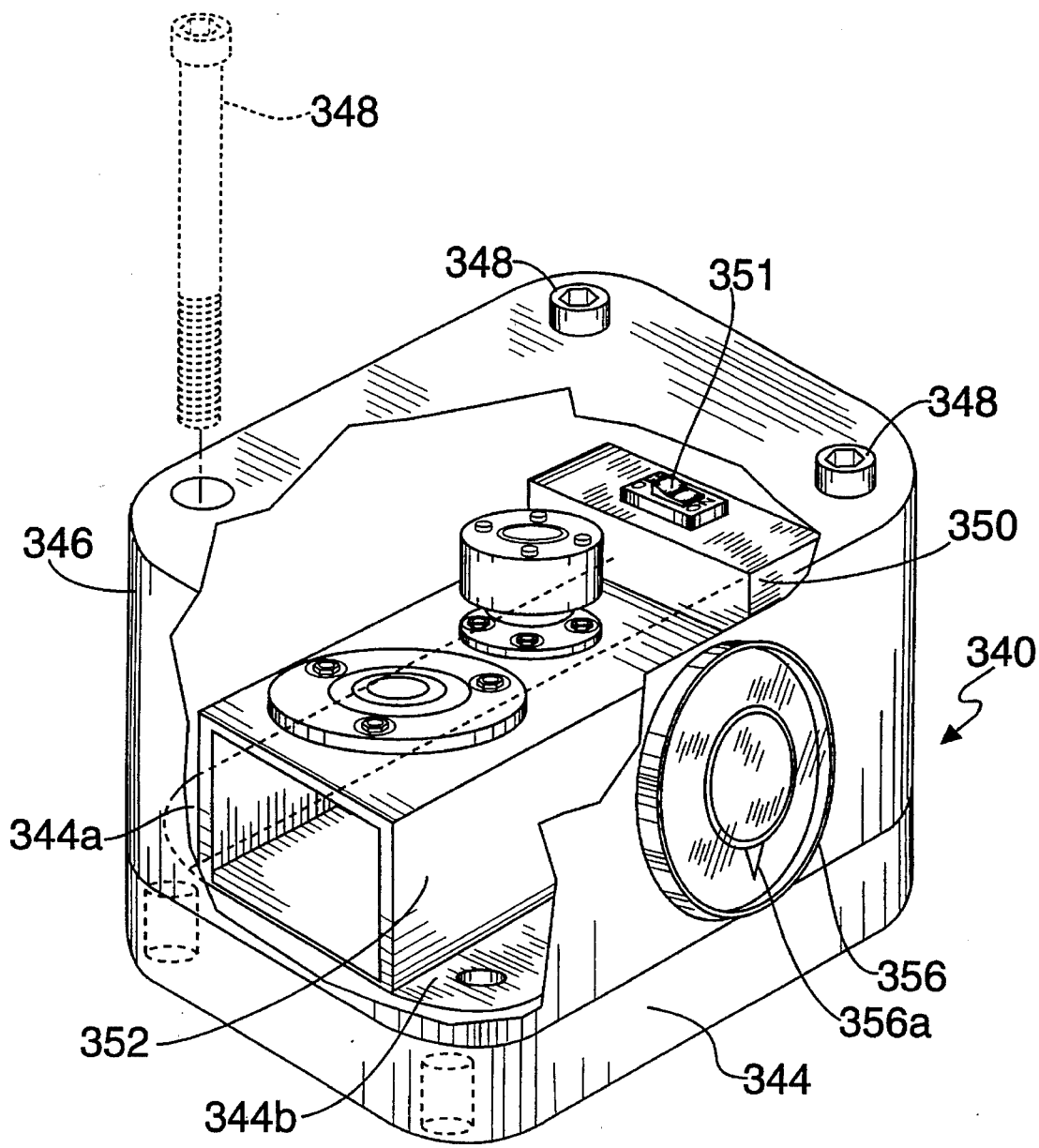

FIG. 19 is a diagram of an embodiment using separate, independently adjustable laser diode assemblies, and only the field prism 324. As in the embodiment of FIG. 17, the field prism 324 bends the light beam originating from the field laser diode assembly 320 by 90 degrees. The bent light beam enters the field lens 310 which serves to collect the light beam further and to direct the beam along the field axis F over a relatively far range from the MRTI. The field light beam may be aligned with the reference light beam emitted along the axis R by the reference laser diode assembly 300, by adjustment of the collimating caps 330, 312 associated with the field and reference laser diode assemblies 320, 300. Using the two means of adjustment, the light beams emitted along axes F, R can be brought parallel and coincident with one another to achieve accurate alignment.

All the embodiments of FIGS. 16–19 employ laser diode assemblies having adjustable collimating caps for purposes of aligning the reference axis R with the field axis F, so that the axes are parallel and coincident with one another to form a common sighting axis, and a reference point observed along the axis R is defined at 180 degrees from a selected point sighted along the field axis F. Enlarged views of the adjustable collimating cap assemblies, are given in FIGS. 24(a) and 24(b).

In those embodiments using the field and the reference prisms, suitable mirrored reflecting elements may be used instead of either one or both of the prisms.

A diode element suitable for use in the reference laser diode assembly is type HL6720G from Hitachi, rated at 5 mW at a wavelength of 670 nm. A suitable diode element for the field laser diode assembly is Hitachi type HL6312G rated at 5 mW at a wavelength of 633 nm. If a visible beam line along either of the field and reference axes F, R is desired, then an NEC laser diode type NDL3315 provides 10 mW power output at 670 nm and should be suitable for beam line applications.

FIGS. 20–23 show another embodiment of a MRTI 340. The MRTI 340 uses a dual laser diode module assembly 342 which is shown in detail in FIGS. 23(a) to 23(c).

The MRTI 340 has a platform or base 344 and a protective cover 346. The cover 346 is fastened to the platform base 344 by four removable fastening screws 348 near each corner of the cover. The screws 348 pass through corresponding openings in the cover 346, and engage threaded openings near corresponding corners of the base 344. A box or frame member 352 is fixed to the base 344, with the axis of the frame member 352 above and parallel to the long center line of the base. Base 344 has raised portions 344a, 344b on its upper surface, and the frame member 352 is seated tightly between the raised edges of the platform portions 344a, 344b. See FIGS. 20 and 22.

Figure 21:
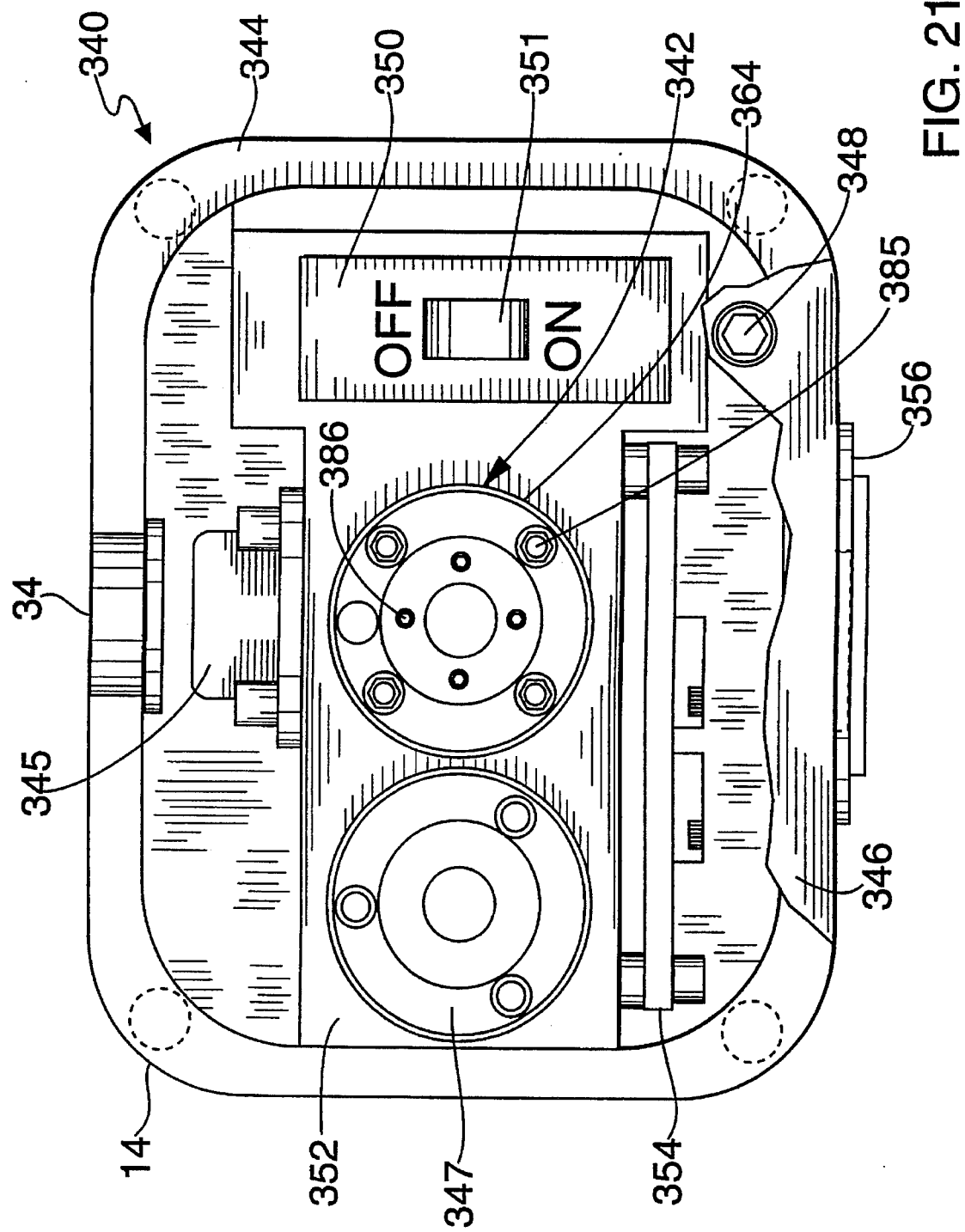

The side and top walls of the frame member 352 define vertical and horizontal surfaces with respect to the base 344 to which the member 352 is fixed. As seen in FIG. 21, a first bull's eye level 345 is fixed to a side wall of the frame member 352, and a second bull's eye level 347 is fixed to a top wall of the frame member 352 at the left end of the frame member. A power supply module 350 having an ON/OFF switch 351 accessible through an opening in the cover 346, is mounted at the right end of the frame member 352. The power supply module 350 is connected via leads (not shown) with laser diode drive circuitry 354. The drive circuitry 354 is mounted on a side wall of the frame member 352 opposite the side wall from which the first bull's eye level 345 projects.

A conventional "angle finder" 356 is fastened on the outside surface of a side wall of cover 346, to present a calibrated 360 degree dial face to the user. See FIG. 20. A weighted, free swivel pointer 356a points constantly downwardly and the dial face of the angle finder 356 is set to obtain a "0" reading when the instrument base 344 is aligned with a horizontal plane.

Figure 22:
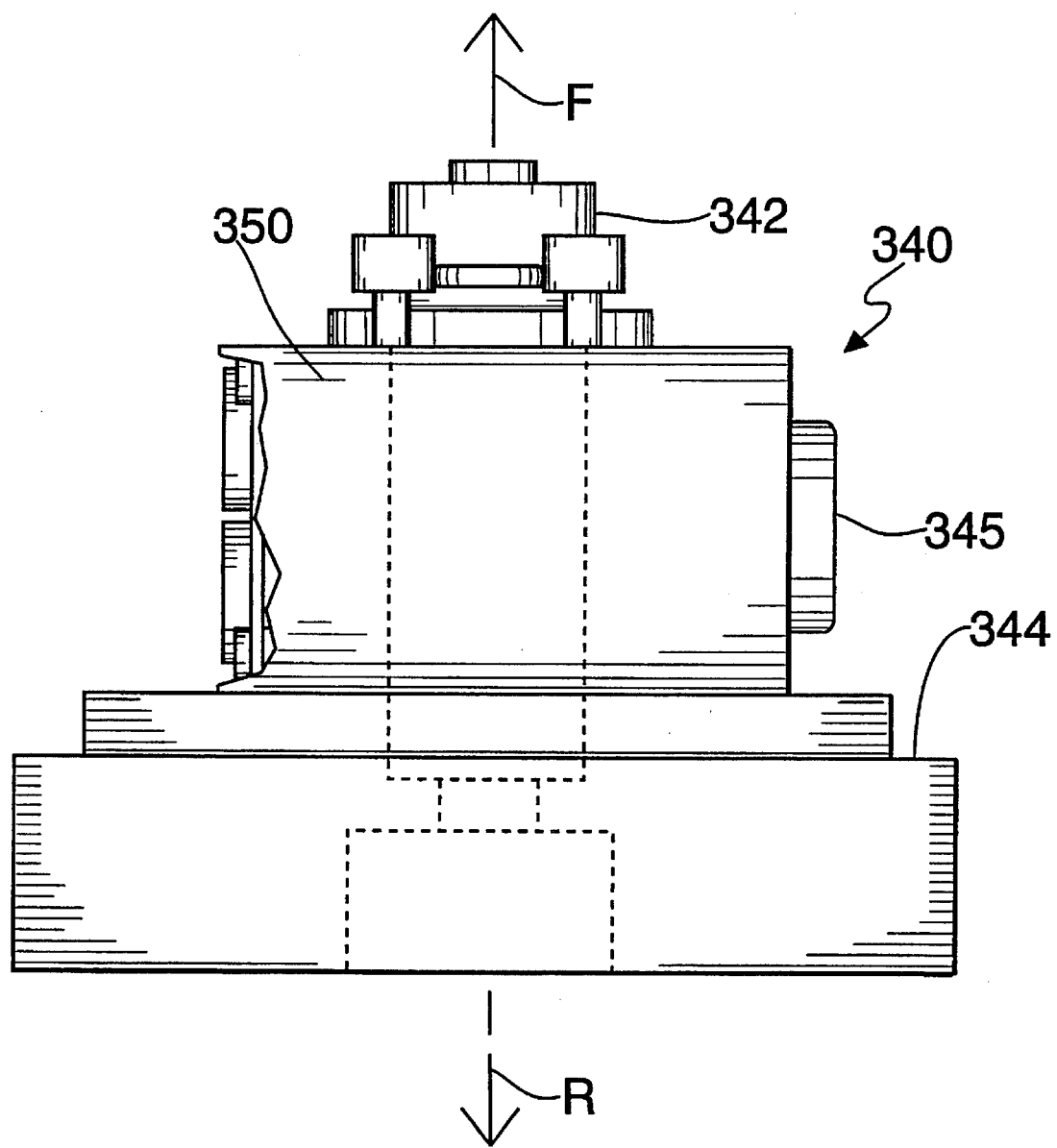

The dual laser diode module assembly 342 is of generally cylindrical form and is mounted within axially aligned openings cut in the top and bottom walls of the frame member 352, and in the platform base 344 (see FIG. 22). The diode module assembly 342 itself is shown in different assembly stages in FIGS. 23(a), 23(b) & 23(c). FIG. 23(a) shows internal elements of the diode module assembly 342; FIG. 23(b) shows a cylindrical housing 360 and a collimation cap assembly 362; and FIG. 23(c) shows the diode module 342 as mounted with a flange clamp arrangement 364 which engages the top wall of the instrument frame member 352.

Internal elements of the diode module assembly 342 include a field lens 366 for concentrating the beam of laser light emitted from laser diode element 368. Diode element 368 is driven by the drive circuitry 354 which is connected via leads (not shown) to a socket connector 370 into which the diode element 368 is inserted. Alternatively, that portion of the drive circuitry 354 which drives the diode element 368 may be housed within the socket connector 370, making it necessary only to connect the switched power supply module 350 to the drive circuitry through a connector/spacer element 372. The module assembly 342 also has, on the reference axis R side, a reference lens 374 for concentrating a laser light beam emitted from a second laser diode element 376. Diode element 376 is inserted in socket connector 378 which is coupled to the drive circuitry 354. Alternatively, that portion of the drive circuitry 354 which energizes the diode element 376 may be housed within the socket connector 378 and the switched power supply module 350 can be connected to the drive circuitry through the connector/spacer element 372.

The field and reference lenses 366, 374, the diode elements 368, 376, socket connectors 370, 378 and the connector/spacer element 372 are housed and sealed within the cylindrical housing 360. A flange 380 on the outside circumference of the housing 360 serves to lock the entire diode module assembly 342 within the openings machined in the frame member 352 and base 344 of the MRTI 340. The module assembly 342 is captured and held secure by the flange clamp arrangement 364 in FIG. 23(c), which includes a removable flange ring 382 slidable over the top of the module assembly 342 into abutment with the flange 380. The flange ring 382 is fastened to the top wall of the frame member 352 via four mounting screws 385 (see also FIG. 21), with the module flange 380 sandwiched between the flange ring 382 and the frame member top wall.

The laser diode module assembly 342 also includes an O-ring 384, and the collimation cap assembly 362 having four adjusting screws 386 (see FIG. 21). The collimation cap assembly 362 enables the axis of the laser light beam emitted from diode element 368 and passing through the field lens 366, to be skewed a certain amount by adjustment of the screws 386, to bring the field laser beam axis F parallel and coincident with the light beam emitted from reference diode element 376 through the lens 374. Such skewing of the field beam axis is accomplished by causing the optical axis of the field lens 366 mounted at the top of the cap assembly 362, to be angularly offset with respect to the axis of the light beam emitted from the diode element 368 fixed within the housing 360. As the adjusting screws 386 are turned in either sense of rotation, the axis of the cap assembly 362 is deviated as desired with respect to the axis of the housing 360, while the resilient O-ring 384 maintains a tight seal between the cap assembly 362 and the interior of the module housing 360. That is, as the axis of the cap assembly 362 is deflected, the field lens 366 is likewise deflected with the result is that the field and reference light beam axes F, R can be aligned with one another.

A major advantage of the MRTI embodiment of FIGS. 20–23 is that no prisms or other mirror reflecting surfaces with associated adjustment means are present. The weight and expense of such optical components including eyepieces, makes the MRTI 340 lighter and less expensive to manufacture than the other disclosed embodiments. Ease of co-planing and of collimating the reference and field axes F, R make the MRTI 340 easy to assemble and calibrate. Reliability and accuracy are enhanced by eliminating "prism shock" or other movement during use tending to misalign critical components. Also, by eliminating an eyepiece, the MRTI 340 is safer to use with the possibility of eye injuries arising from laser light beam emissions being greatly reduced.

The MRTI 340 may nonetheless incorporate the various base platform configurations and adapters disclosed herein. The user thus need not look into the eyepiece 42 as required in the FIG. 1 embodiment, but, rather, can instead mark or cover a reference point with a laser beam dot. The MRTI 340 can be leveled at the working location while keeping the beam dot on the reference point. Once accurately collimated, the MRTI 340 in effect provides two laser beams emitted precisely 180 degrees apart. The instrument is therefore very handy in field use, particularly when mounted on the swivel mechanism of FIGS. 14A and 14B.

The MRTI housing is in a form that can be totally cast and can be maintained in a sealed condition with, e.g., dry nitrogen. In such case, castings should have an epoxy finish to be impervious to the sealing gas. O-rings or gaskets for the cover fastening screws 348, and between the instrument cover 346 and the platform base 344, would ensure nitrogen or other inert gas sealing of the MRTI 340.

While the foregoing description represents preferred embodiments of the present invention, it will be obvious to those skilled in the art that various changes and modifications may be made. Accordingly, the scope of the invention is pointed out and delimited only by the following claims.

What I claim is:

1. A measurement referencing and transferring method, comprising the steps of:

locating a platform base at a working location;

mounting sighting means having a sighting axis on the platform base;

sighting a first selected point on a first object in a given direction from the platform base by adjusting the position of the platform base relative to the working location thereby directing the sighting axis of the sighting means toward said first object, and aligning said axis to be incident with the first selected point on the first object;

marking a first reference point on a second object in a direction opposite said given direction from the platform base by observing along the aligned sighting axis in the direction away from said first object, and defining the first reference point as that point on the second object with which said sighting axis is incident; and determining a measurement associated with the first selected point on the first object by referring to the first reference point marked on the second object.

2. The method of claim 1, including defining the sighting axis with a light beam by using at least one laser device as a part of the sighting means.

3. The method of claim 1, including defining the sighting axis with an optical axis by using at least one optical viewing arrangement as a part of the sighting means.

4. The method of claim 1, including defining the sighting axis in one direction from the platform base with a light beam by using a laser device as a part of the sighting means, and defining the sighting axis in the opposite direction of the platform base with an optical axis by using an optical viewing arrangement as another part of the sighting means.

5. The method of claim 1, including defining the sighting axis in said one direction and in said opposite direction from the platform base with a light beam by using a laser device as part of the sighting means.

6. The method of claim 1, including defining the sighting axis in said one direction and in said opposite direction from the platform base with an optical axis by using an optical viewing arrangement as part of the sighting means.

7. The method of claim 1, including leveling the platform base with respect to a reference plane at the working location.

8. The method of claim 1, including mounting the platform base for adjustable swiveling movement at the working location.

9. The method of claim 8, including mounting the platform base for adjustable swiveling movement in azimuth and in elevation.

10. The method of claim 1, including sighting a second selected point on said first object in a given direction from the platform base by adjusting the position of the platform base relative to the working location thereby directing the sighting axis of the sighting means toward said first object, and aligning said axis to be incident with the second selected point on the first object;

marking a second reference point on said second object in a direction opposite said given direction from the platform base by observing along the aligned sighting axis in the direction away from said first object, and defining the second reference point as that point on the second object with which said sighting axis is incident; and determining a measurement associated with the first and the second selected points on the first object, by referring to the first and the second reference points marked on the second object.

11. The method of claim 10, including locating the platform base at a different working location prior to performing said second selected point sighting and said second reference point marking steps.

12. A measurement referencing and transferring instrument, comprising:

a platform base;

sighting means mounted on the platform base and having a sighting axis;

means associated with the platform base for adjusting the position of the platform base relative to a working location at which the base is located, including means for directing the axis of the sighting means in a given direction from the base toward the first object, and for aligning said axis to be incident on a selected point on the first object;

said sighting means having means for marking a reference point on a second object in a direction opposite said given direction from the platform base, and for directing said sighting axis when aligned to be incident on the first selected point on the first object in the direction away from the first object, wherein a reference point corresponding to the selected point on the first object is defined as that point on the second object with which said sighting axis is incident.

13. A measurement referencing and transferring instrument according to claim 12, wherein said sighting means includes at least one laser device operative to emit a visible light beam to define the sighting axis.

14. A measurement referencing and transferring instrument according to claim 12, wherein said sighting means includes at least one optical viewing arrangement having an optical axis which defines the sighting axis.

15. A measurement referencing and transferring instrument according to claim 12, wherein said sighting means includes means for emitting a visible light beam which defines the sighting axis in one direction from the platform base, and optical viewing means having a view axis which defines the sighting axis in the opposite direction from the platform base.

16. A measurement referencing and transferring instrument according to claim 12, including means for leveling the platform base with respect to a reference plane at said working location.

17. A measurement referencing and transferring instrument according to claim 12, including means for mounting the platform base for adjustable swiveling movement at the working location.

18. A measurement referencing and transferring instrument according to claim 17, wherein said mounting means includes means for setting the platform base at desired angles in azimuth and elevation.

19. A measurement referencing and transferring method, comprising:

locating a platform base at a working location;

supporting light source means having a beam axis on the platform base;

spotting a first selected point on a first object by emitting a first light beam from the platform base along the beam axis of the light source means in the direction of the first object;

marking on a second object a first reference point corresponding to the first selected point on the first object, by emitting a second light beam from the platform base along said beam axis but in the direction away from said first object, thereby defining the first reference point on the second object by emitting the first and the second light beams at an angle of 180 degrees relative to one another; and determining a measurement associated with the first selected point on the first object by referring to the first reference point marked on the second object.

20. The method of claim 19, including spotting a second selected point on the first object by emitting the first light beam from the platform base along the beam axis of the light source means in the direction of the first object;

marking on the second object a second reference point corresponding to the second selected point on the first object, by emitting the second light beam from the platform base along said beam axis but in the direction away from said first object, thereby defining the second reference point on the second object by emitting the first and the second light beams at an angle of 180 degrees relative to one another; and determining a measurement associated with the first and the second selected points on the first object by referring to the first and the second reference points marked on the second object.

21. The method of claim 20, including leveling the platform base with respect to a reference plane at the working location.

22. The method of claim 20, including emitting both of the first and the second light beams by using a laser device as the light source means.

23. The method of claim 22, including using a laser diode as the laser device.

24. The method of claim 20, including mounting the platform base for adjustable swiveling movement at the working location.

25. A measurement referencing and transferring instrument, comprising:

a platform base;

optical viewing means fixed on the platform base and having a view axis for enabling a user to sight a reference point along the view axis; and light source means fixed on said base and having a beam axis, for emitting a light beam along the beam axis in a direction away from said reference point;

wherein said optical viewing means and said light source means are arranged so that the beam axis of the light source means can be aligned parallel to the view axis of the optical viewing means.

26. A measurement referencing and transferring instrument according to claim 25, including means associated with the platform base for leveling said base with respect to a reference plane.

27. A measurement referencing and transferring instrument according to claim 25, wherein said light source means comprises a laser device.

28. A measurement referencing and transferring instrument according to claim 26, wherein said leveling means includes at least one bull's eye level.

29. A measurement referencing and transferring instrument according to claim 25, wherein said optical viewing means includes a field viewing glass having a reticle.

30. A measurement referencing and transferring instrument according to claim 29, wherein said optical viewing means comprises an eyepiece, and reflecting means for defining an optical path between said field viewing glass and said eyepiece.

31. A measurement referencing and transferring instrument according to claim 30, wherein said reflecting means comprises at least one prism.

32. A measurement referencing and transferring instrument according to claim 30, wherein said platform base has a viewing opening coaxial with said view axis, and the field viewing glass is fixed in the circumference of the viewing opening.

33. A measurement referencing and transferring instrument according to claim 32, wherein a bottom surface of said platform base has at least one groove extending in a direction beneath said viewing opening, said groove being cut and dimensioned to receive a tape measure and to enable indicia on the tape measure to be sighted along the view axis of said optical viewing means.

34. A measurement referencing and transferring instrument, comprising:

a platform base having a viewing opening;

frame means on a top surface of the platform base for supporting instrument components;

optical viewing means parts of which are supported by said frame means and having a view axis for enabling a user to sight a reference point along the view axis, wherein said view axis passes through the viewing opening in said platform base;

light source means parts of which are supported by said frame means and having a beam axis, for emitting a light beam along the beam axis in a direction away from said reference point; and means for adjusting at least one of said optical viewing means and said light source means, so that the beam axis of the light source means can be aligned parallel to the view axis of the optical viewing means.

35. A measurement referencing and transferring instrument according to claim 34, including means fixed on said frame means for leveling the platform base with respect to a reference plane.

36. A measurement referencing and transferring instrument according to claim 34, wherein said light source means comprises a laser device mounted on said frame means.

37. A measurement referencing and transferring instrument according to claim 35, wherein said leveling means includes at least one bull's eye level fixed with respect to said frame means.

38. A measurement referencing and transferring instrument according to claim 34, including a field viewing glass having a reticle, the viewing glass being fixed in the circumference of the viewing opening in said platform base and forming a part of said optical viewing means.

39. A measurement referencing and transferring instrument according to claim 34, wherein said optical viewing means comprises an eyepiece, and reflecting means inside said frame means for defining an optical path between said field viewing glass and said eyepiece.

40. The instrument of claim 39, wherein said reflecting means comprises at least one prism.

41. The instrument of claim 34, wherein a bottom surface of said platform base has at least one groove extending in a direction beneath the viewing opening in said platform base, said groove being cut and dimensioned to receive a tape measure and to enable indicia on the tape measure to be sighted along the view axis of said optical viewing means.

42. The instrument of claim 34, including mounting means for enabling the instrument to plummet downward with respect to a ground reference mark, the mounting means comprising;

mounting plate means for engaging a bottom surface of said platform base, mounting bracket means pivotally connected to said mounting plate means so that said mounting plate means can swing about a horizontal axis with respect to the mounting bracket means, tribrach means for fixing the mounting bracket means atop a tripod over a ground reference mark, said mounting bracket means being mounted on said tribrach means for swiveling movement about a vertical axis with respect to said tribrach means, said mounting bracket means and said tribrach means having passages for alignment with the beam axis of said light source means when said mounting plate means is swung to position the instrument so that said beam axis extends vertically downward to plummet the instrument over said ground reference mark.

43. The instrument of claim 42, including leveling means on said mounting plate means for leveling the platform base of the instrument with respect to a horizontal plane when the mounting plate means is swung to plummet the instrument over the ground reference mark.

44. The instrument of claim 42, including means associated with said mounting plate means for locking the mounting plate means with respect to said mounting bracket means at a desired elevation angle.

\* \* \* \* \*